US009311745B2

(12) United States Patent
Andrade et al.

(10) Patent No.: US 9,311,745 B2
(45) Date of Patent: Apr. 12, 2016

(54) SYSTEMS AND METHODS OF ANALYSIS OF GRANULAR ELEMENTS

(71) Applicant: California Institute of Technology, Pasadena, CA (US)

(72) Inventors: Jose Andrade, Pasadena, CA (US); Keng-Wit Lim, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 463 days.

(21) Appl. No.: 13/741,324

(22) Filed: Jan. 14, 2013

(65) Prior Publication Data

US 2013/0185035 A1    Jul. 18, 2013

Related U.S. Application Data

(60) Provisional application No. 61/586,604, filed on Jan. 13, 2012.

(51) Int. Cl.
 *G06F 17/10* (2006.01)
 *G06T 17/00* (2006.01)
 *G06T 17/30* (2006.01)

(52) U.S. Cl.
 CPC .................. *G06T 17/00* (2013.01); *G06T 17/30* (2013.01); *G06T 2210/21* (2013.01); *G06T 2210/56* (2013.01)

(58) Field of Classification Search
 None
 See application file for complete search history.

(56) References Cited

U.S. PATENT DOCUMENTS

| 2004/0090437 A1 | 5/2004 | Uesaki et al. |
| 2007/0179685 A1 | 8/2007 | Milam et al. |
| 2007/0219760 A1 | 9/2007 | Yang et al. |
| 2011/0148865 A1 | 6/2011 | Lim et al. |

FOREIGN PATENT DOCUMENTS

| EP | 2116976 A2 | 11/2009 |
| WO | 2013106861 A1 | 7/2013 |

OTHER PUBLICATIONS

Tijsken et al. Discrete Element Modeling for Process Simulation in Agriculture Journal of Sound and Vibration 266, 2003, pp. 493-514.*

(Continued)

*Primary Examiner* — Omar Fernandez Rivas
*Assistant Examiner* — Cuong Luu
(74) *Attorney, Agent, or Firm* — KPPB LLP

(57) ABSTRACT

Systems and methods are described for performing mechanical analysis of particulate systems by describing particle morphology of particles within the system using Non-Uniform Rational Basis Spline (NURBS). One embodiment includes generating a NURBS description for the particle morphology of a plurality of particles within a particulate system, determining contact points between at least two particles based on the NURBS description, determining a magnitude of the contact between the at least two particles based on the NURBS description, determining normal forces and associated moments based upon the contact points and the magnitude of the contact between the at least two particles, determining tangential forces and associated moments based upon the contact points and the magnitude of the contact between the at least two particles, and performing mechanical analysis of the particulate system based on the contact between the at least two particles and the resulting forces and associated moments.

15 Claims, 13 Drawing Sheets

(56) References Cited

OTHER PUBLICATIONS

Page et al. Collision Detection Algorithm for NURBS Surfaces in Interactive Applications CCECE 2003.*

Tu et al. Criteria for Static Equilibrium in Particulate Mechanics Computation Int. Journal for Numerical Methods in Engineering 2008: 75 pp. 1581-1606.*

M.G. Cox, "The Numerical Evaluation of B-Splines", Technical Report, National Physics Laboratory DNAC 4, 1971, pp. 134-149.

O Sullivan et al., Particulate Discrete Element Modeling: A Geomechanics Perspective. Applies Geotechnics, Spon Press/Taylor & Francis, 2011, pp. 145-174.

O.R. Walton et al., "Simulation of Rotary-Drum and Repose Tests for Frictional Spheres and Rigid Sphere Clusters", Joint DOE/NFS Workshop on Flow of Particulates and Fluids, Ithaca, New York, Sep. 29-Oct. 1, 1993, pp. 1-17.

P.A. Cundall, "Formulation of a Three-Dimensional Distinct Element Model-Part I: A Scheme to Detect and Represent Contacts in a System Composed of Many Polyhedral Blocks", Int. J. Rock Mech. Min. Sci. & Geomech, 1988, vol. 25, No. 3, pp. 107-116.

P.A. Cundall et al., "A Discrete Numerical Model for Granular Assemblies", Gèotechnique, 1979, vol. 29, No. 1, pp. 47-65.

R. D. Mindlin, "Compliance of Elastic Bodies in Contact", Journal of Applied Mechanics, 1949, vol. 71, pp. 259-268.

R. Hart ETL Al., "Formulation of a Three-dimensional Distinct Element Model—Part II: Mechanical Calculations for Motion and Interaction of a System Composed of Many Polyhedral Blocks", in. J. Rock. Mech. Min. Sci., 1988, vol. 25, No. 3, pp. 117-125.

Robert McNeel & Associates, Rhinoceros (Rhino), http://www.rhino3d.com/, 2012.

Krishnan et al., "An Efficient Surface Intersection Algorithm based on Lower Dimensional Formulation", ACM Trans. Graph, Jan. 1997, vol. 16, pp. 74-106.S.

Sintef ICT, Department of Applied Mathematics, Norway, The SINTEF Spline Library, http://wvvwsintef.no/sisl.

T. Dokken, "Finding Intersections of B-Spline Represented Geometries Using Recursive Subdivision Techniques", Computer Aided Geometric Design, Sep. 1985, vol. 2, pp. 189-195.

T. Li et al., "Incremental 3D Collision Detection with Hierarchical Data Structures", Proceedings of the ACM symposium on Virtual Reality Software and Technology, VRST 1998, pp. 139-144.

T. Möller, "A Fast Triangle-Triangle Intersection Test", Journal of Graphics Tools, 1997, vol. 2, pp. 25-30.

T. Sederberg et al., "T-Spline Simplification and Local Refinement", ACM Trans. Graph., Aug. 2004, vol. 23, pp. 276-283.

T. W. Sederberg et al., "Curve Intersection Using Bèzier Clipping", Computer Aided Design, Nov. 1990, vol. 22, No. 9, pp. 538-550.

T.J.R. Hughes et al., "Isogeometric Analysis: CAD, Finite Elements, NURBS, Exact Geometry and Mesh Refinement", Computer Methods in Applied Mechanics and Engineering, 2005, vol. 194, pp. 4135-4195.

V. Skytt, "Challenges in Surface-Surface Intersections", T. Dokken and B. Jüttler, editors, Computational Methods for Algebraic Spline Surface, Springer, 2004, pp. 11-26.

X. Garcia et al., "A Clustered Overlapping Sphere Algorithm to Represent Real Particles in Discrete Element Modeling", Geotechnique, 2009, vol. 59, No. 9, pp. 779-784.

X. Tu et al., "Criteria for Static Equilibrium in Particulate Mechanics Computations", International Journal for Numerical Methods in Engineering, 2008, vol. 75, pp. 1581-1606.

Xavier Garcia et al., "Numerical Study of the effects of Particle Shape and Polydispersity on Permeability", Physical Review E, 2009, vol. 80, No. 02134, pp. 1-9.

Y. Fu, "Experimental Quantification and DEM Simulation of Micro-Macro Behaviors of Granular Materials Using X-Ray Tomography Imaging", Dissertation, Louisiana State University, Agricultural and Mechanical College, and Department of Civil and Environmental Engineering. Dec. 2005, pp. 1-269.

International Search Report and Written Opinion for PCT/US2013/021493, International Filing Date Jan. 14, 2013, Search completed Apr. 30, 2013, Mailed Apr. 30, 2013, 8 pgs.

A. Ashmawy et al., "Evaluating the Influence of Particle Shape on Liquefaction Behavior Using Discrete Element Modeling", Proceedings of the Thirteenth 2003 International Offshore and Polar Engineering Conference, Honolulu, Hawaii, USA, May 25-30, 2003, p. 542.

A. Krishnamurthy et al., "Performing Efficient NURBS Modeling Operations on the GPU", Proceedings of the 2008 ACM Symposium on Solid and Physical Modeling, SPM 2008, ACM, pp. 257-268.

A. Peña et al.,"Modeling Slow Deformation of Polygonal Particles using DEM", Particuology, 2008, vol. 6 , pp. 506-514.

A. Sallam, "Studies on Modeling Angular Soil Particles Using the Discrete Element Method", Ph.D. Thesis. Paper 1232, University of South Florida, Tampa, FL, Nov. 12, 2004, pp. 1-229.

Algis Dziugys et al., "An Approach to Simulate the Motion of Spherical and Non-Spherical Fuel Particles in Combustion Chambers", Granular Matters, 2001, vol. 3, No. 4, pp. 231-265.

B. Sukumaran et al., "Quantitative Characterisation of the Geometry of Discrete Particles", Geotechnique, 2001, vol. 51, pp. 619-627.

C. K. Shene, "CS3621 Introduction to Computing with Geometry", http:www.cs.mtu.edu/shene/COURSES/cs3621/NOTES, Jul. 2011.

C. Schulz, "Bezier Clipping is Quadratically Convergent", Computer Aided Geometric Design, Jan. 2009, vol. 26, Iss. 1, pp. 61-74.

Carl De Boor, "On Calculating with B-Splines", Journal of Approximation Theory, 1972, vol. 6, pp. 50-62.

Caroline Hogue et al., "Efficient Computer Simulation of Moving Granular Particles", Powder Technology, 1994, vol. 78, No. 1, pp. 51-66.

C. Ericson, Real-Time Collision Detection, Morgan Kaufmann Publications, San Francisco, 2005.

D. J. Evans et al., "Singularity Free Algorithm for Molecular Dynamics Simulation of Rigid Polyatomics", Molecular Physics,1977, vol. 34, No. 2, pp. 327-331.

D. Muir Wood, Soil Behavior and Critical State Soil Mechanics, Cambridge University Press, Cambridge, UK, 1990, pp. 84-174.

David F. Rogers et al., "An Introduction to NURBS", Academic Press, S.D., 2001.

Dawei Zhao et al., "Three-dimensional Discrete Element Simulations for Granular Materials", Engineering Computations: International Journal for Computer-Aided Engineering and Software, 2006, vol. 23, No. 7, pp. 749-770.

E. Cohen et al., "Geometric Modeling with Splines: An Introduction", A K Peters, Ltd, Natick, MA, USA 2001, pp. 528-535.

F. Alonso et al., "Calculation of the Incremental Stress-Strain Relation of a Polygonal Packing", Physical Review E, 2002, vol. 66, No. 021301, pp. 1-11.

G.T. Houlsby, "Potential Particles: A Method for Modeling Non-Circular Particles in Dem", Computer and Geotechnics, 2009, vol. 36, pp. 953-959.

Gye-Chun Cho et al., "Particle Shape Effects on Packing Density, Stiffness, and Strength: Natural and Crushed Sands", Journal of Geotechnical and Geoenvironmental Engineering, ASCE, May 2006, pp. 591-602.

H. Goldstein, et al., Classical Mechanics, 3rd Ed., Addison Wesley, 2001, pp. 134-181.

I. Vlahinič et al., Towards a More Accurate Characterization of Granular Media: Extracting Quantitative Descriptors from Grain-Scale Images, Granular Matter, Paper under review.

J. Christoffersen et al. "A Micromechanical Description of Granular Material Behavior", Journal of Applied Mechanics, Jun. 1981, vol. 48, pp. 339-344.

J. E. Andrade et al. "Granular Element Method (GEM): Linking Inter-Particle Forces With Macroscopic Loading", Granular Matter, 2012, vol. 14, pp. 51-61.

J. E. Andrade et al., "Granular Element Method for Computational Particle Mechanics", Comput. Methods Appl. Mech. Engrg., 2012, 241-244, pp. 262-274.

J. E. Andrade et al. "Multiscale Framework for Behavior Prediction in Granular Media", Mechanics of Materials, 2009, vol. 41, pp. 652-669.

(56) References Cited

OTHER PUBLICATIONS

J. Harkness, "Potential Particles for Modeling of Interlocking Media in Three Dimensions", International Journal for Numerical Methods in Engineering, 2009, vol. 80, No. 12, pp. 1573-1594.

J.E. Andrade et al. "Multiscale Modeling and Characterization of Granular Matter: From Grain Kinematics to Continuum Mechanics", Journal of the Mechanics and Physics of Solids, 2011, vol. 59, pp. 237-250.

J. Fisher et al., "If You Know B-Splines Well, You Also Know NURBS!", SIGCSE Bull., Mar. 2004, vol. 36, pp. 343-347.

John M. Ting et al., "An Ellipse-Based Discrete Element Model for Granular Materials", International Journal for Numerical and Analytical Methods in Geomechanics, 1993, vol. 17, No. 9, pp. 603-623.

K. Mørken et al., "Computing Intersections of Planar Spline Curves using Knot Insertion", Computer Aided Geometric Design, Mar. 2009, vol. 26, doi:10.1016/j.cagd.2008.07.005, pp. 351-366.

L. Pournin et al., "A Generalization of Distinct Element Method to Tridimensional Particles with Complex Shapes", Proceedings of Powders & Grains, Balkema, Leiden, 2005, pp. 1-4.

Leo Rothenburg et al., "Numerical Simulation of Idealized Granular Assemblies With Plane Elliptical Particles", Computers and Geotechnics, 1991, vol. 11, No. 4, pp. 315-329.

Les Piegl et al., "The NURBS Book, 2nd Edition, Springer-Verlag New York, Inc., New York, NY, USA, 1997, pp. 1-139.".

M. Babic, "Discrete Particle Numerical Simulation of Granular Material Behavior", Technical Report 88-11, Department of Civil and Environmental Engineering, Clarkson University, Dec. 1988, pp. ii-92.

* cited by examiner

SYSTEMS AND METHODS OF ANALYSIS OF GRANULAR ELEMENTS

CROSS-REFERENCE TO RELATED APPLICATIONS

The present invention claims priority to U.S. Provisional Patent Application Ser. No. 61/586,604 entitled "Granular Element Method (GEM)" to Andrade et al., filed Jan. 13, 2012. The disclosure of U.S. Provisional Patent Application Ser. No. 61/586,604 is herein incorporated by reference in its entirety.

STATEMENT OF FEDERALLY SPONSORED RESEARCH

This invention was made with government support under CHE1060087 awarded by the National Science Foundation. The government has certain rights in the invention.

FIELD OF THE INVENTION

The present invention generally relates to analysis of particulate systems and more specifically relates to the simulation of particulate systems based on Newtonian mechanics in a way that accounts for the morphology of the particles.

BACKGROUND

Particle morphology can be characterized, in general, by three properties: sphericity, roundness, and roughness. These properties are sometimes referred to by other names such as shape, angularity, and surface roughness, respectively. In either case, these properties are scale dependent, as they measure morphological characteristics at different length scales, with increased spatial resolution needed to measure roughness, for example. Particle morphology has been shown to be crucially important for macroscopic properties in granular materials. Some of the most critical macroscopic properties used in engineering and science are strength and permeability, and both of these are intimately affected by particle morphology. In the case of macroscopic strength, it has been determined that lack of sphericity, sharper angularity and increased roughness all lead to increased mobilized strength in granular materials. This macroscopic effect is due to micromechanical effects such as increased number of contact points. Therefore, accurate micromechanical models for granular materials should be able to correctly capture particle morphology if they are to correctly predict the macroscopic strength in real materials such as sands.

The Discrete Element Method (DEM) was introduced in order to reveal micromechanical features that were simply not accessible to continuum models. This modeling paradigm has allowed tremendous access to understand most features of the micromechanical behavior of granular materials and link them with macroscopic response. DEM starts with the underlying assumption that particles are discrete elements and by utilizing numerical methods computes the motion and effect of a large number of such particles. A DEM simulation typically involves first generating a model that results in spatially orienting all particles and assigning an initial velocity. Next, the forces that act on each individual particle can be calculated using initial data, relevant physical laws, and particle contact models. All the forces are added together to find the total force acting on each particle and an integration method computes the change in the position and the velocity of each particle during a particular time step. The resulting new positions of the particles are used to compute forces for the next time step and the process is repeated until the predetermined time period for the simulation is completed. DEM is a powerful analytical tool and has applications in chemical, civil engineering, oil and gas, mining, mineral processing and pharmaceutical industries to name a few.

Increases in computational power have allowed for longer simulations and the inclusion of more particles when conducting DEM calculations. However, the link to macroscopic response remains mainly qualitative (as opposed to quantitative) in large part due to the challenges within DEM of accurately capturing particle morphology. Clustering and polyhedra are currently two widely discussed techniques that can be used to capture three-dimensional particle morphology in natural materials. Clustering is relatively simple to implement in current codes but cannot represent particle curvature readily, which could impact contact properties such as normal and tangential forces, thereby potentially changing macroscopic response. On the other hand, polyhedra can represent complex geometrical entities fairly well (especially in two dimensions), but contact detection algorithms available for these geometrical entities are rather complex (especially in three dimensions) as they introduce the need to deal with face-to-node, node-to-node, and face-to-face contact.

New characterization tools such as X-ray computed tomography (CT) enable direct measurement of particle morphology, as a function of imaging resolution. Generally, X-ray CT utilizes computer-processed X-rays to produce tomographic images or cross-sectional images of a particle non-destructively. Although, the resulting images provide accurate measurements of particle morphologies, the current DEM techniques such as clustering and polyhedral based methods are limited in their ability to capture particle morphology for the purpose of performing quantitative analysis of macroscopic response.

SUMMARY OF THE INVENTION

Systems and methods are described for performing mechanical analysis of particulate systems by describing particle morphology of particles within the system using Non-Uniform Rational Basis Spline (NURBS). One embodiment of the method of the invention includes: generating a NURBS description for the particle morphology of each of a plurality of particles within a particulate system using a processing system, where the NURBS description of a given particle within the particulate system includes a plurality of control points that define a control polygon bounding the geometry of a NURBS curve, a knot vector that determines the location of a plurality of knots, a basis function of a predetermined degree that determines the number of control points that influence any given point on the NURBS curve, and a plurality of weights that determine the effective contribution of a control point on the overall shape of the NURBS curve; determining contact points between at least two particles within the particulate system based on the NURBS description for the particle morphology of the at least two particles using the processing system; determining a magnitude of the contact between the at least two particles within the particulate system based on the NURBS description for the particle morphology of the at least two particles using the processing system; determining normal forces and associated moments based upon the contact points and the magnitude of the contact between the at least two particles using the processing system; determining tangential forces and associated moments based upon the contact points and the magnitude of the contact between the at least two particles using the processing system; and performing mechanical analysis of the particulate system based on the contact between the at least two particles and the resulting forces and associated moments using the processing system.

In a further embodiment, generating a Non-Uniform Rational Basis Spline (NURBS) description of the morphology for a plurality of particles within the particulate system includes generating a NURBS description of the morphology of at least one particle in two dimensions (2D).

In another embodiment, generating a NURBS description of the morphology of a given particle in 2D includes generating a plurality of NURBS descriptions of the morphology of the given particle in 2D.

In a still further embodiment, determining a magnitude of the contact between the at least two particles within the particulate system further includes: determining two intersection points of contact between two particles within the particulate system; calculating a midpoint for the determined intersection points of contact; determining normal and tangential unit vectors using the calculated midpoint; determining intersection points between a line extending in both directions of the normal vector line and the boundaries of the two particles; approximating an overlap distance between the two particles based on the intersection points between a line extending in both directions of the normal vector line and the boundaries of the two particles; and quantifying the magnitude of contact using the overlap distance between the two particles.

In still another embodiment, wherein determining normal forces and associated moments based upon the contact points and the magnitude of the contact between the at least two particles further includes: determining a normal elastic stiffness for a contact between two particles; determining a contact damping parameter for the contact between the two particles; calculating a normal component of relative velocity with respect to the two particles; calculating a normal force using the normal elastic stiffness, contact damping parameter, and normal component of relative velocity for each of the two particles; and computing a moment arm for each of the two particles; and calculating an associated moment due to the calculated normal force for each of the two particles.

In a yet further embodiment, determining tangential forces and associated moments based upon the contact points and the magnitude of the contact between the at least two particles further includes: determining angular velocities for each of the two particles; calculating a relative tangential velocity for each of the two particles; calculating an increment in tangential force using the relative tangential velocity for each of the two particles; calculating a tangential force at a discrete time state using the calculated increment in tangential force for each of the two particles; and calculating an associated moment due to the tangential force for each of the two particles.

In yet another embodiment, generating a NURBS description of the morphology for a given particle within the particulate system includes generating a NURBS description of the morphology of the given particle in three dimensions (3D).

In a further embodiment again, determining the magnitude of the contact between the at least two particles within the particulate system further includes: identifying pairs of intersecting portions of the surfaces of two particles based on the NURBS descriptions of the particle morphology of the two particles; determining a closed intersection loop for the intersecting portions of the surfaces of two particles; approximating a loop centroid and a loop normal for the closed intersection loop; determining contact points between a line through the loop centroid extending in the direction of the loop normal and the surfaces of each of the two particles; calculating an overlap distance between the two particles based on the contact points between the line through the loop centroid extending in the direction of the loop normal and the surfaces of each of the two particles; and quantifying the magnitude of contact based on the overlap distance between the two particles.

In another embodiment again, the NURBS description of the particle morphology of each of the two particles includes a plurality of NURBS patches, where each NURBS patch describes the particle morphology of a portion of the surface of one of the two particles; and identifying pairs of intersecting portions of the surfaces of two particles based on the NURBS descriptions of the particle morphology of the two particles includes identifying intersections between the NURBS patches from the NURBS descriptions of the particle morphology of each of the two particles.

In a further additional embodiment, determining a closed intersection loop for the intersecting portions of the surfaces of two particles includes performing a surface-surface intersection analysis of at least the intersecting portions of the two surfaces of the two particles.

In another additional embodiment, determining a closed intersection loop by performing a surface-surface intersection analysis further includes: defining flat surfaces for the identified intersecting NURBS patches from the NURBS description of the particle morphology of each of the two particles; discretizing the defined flat surfaces using triangular shapes; applying a convex hull on a set of midpoints of intersection curves forming a closed polygon; and determining a closed intersection loop for the intersecting portions of the surfaces of two particles includes approximating the intersection loop using the closed polygon.

In a still yet further embodiment, determining normal forces and associated moments based upon the contact points and the magnitude of the contact between the at least two particles further includes: determining a normal elastic stiffness for a contact between two particles; determining the overlap distance between the two particles; calculating a normal force for each of the two particles using the normal elastic stiffness and the overlap distance between the two particles; and calculating an associated moment due to the calculated normal force for each of the two particles.

In still yet another embodiment, the overlap distance is determined in vector form.

In a still further embodiment again, determining tangential forces and associated moments based upon the contact points and the magnitude of the contact between the at least two particles further includes: determining angular velocities for each of the two particles; determining translational velocities for each of the two particles; calculating an increment in tangential force for each of the two particles; calculating a tangential force accounting for incremental rotation of the contact plane for each of the two particles; and calculating an associated moment due to the tangential force for each of the two particles.

In still another embodiment again, performing mechanical analysis of the particulate system based on the contact between the at least two particles and the resulting forces and associated moments using the processing system includes performing mechanical analysis of the particulate system using the discrete element method (DEM).

Another further embodiment of the method of the invention includes: generating a Non-Uniform Rational Basis Spline (NURBS) description for the particle morphology of each of a plurality of particles within a particulate system in two dimensions using a processing system, where the NURBS description of a given particle within the particulate system includes a plurality of control points that define a control polygon bounding the geometry of a NURBS curve, a knot vector that determines the location of a plurality of knots, a basis function of a predetermined degree that determines the number of control points that influence any given point on the NURBS curve, and a plurality of weights that determine the effective contribution of a control point on the overall shape of the NURBS curve; determining contact points between at least two particles within the particulate system based on the NURBS description for the particle morphology of the at least two particles using the processing system; determining a magnitude of the contact between the at least two particles within the particulate system based on the NURBS description for the particle morphology of the at least two particles using the processing system by: determining two intersection points of contact between two particles within the particulate system; calculating a midpoint for the determined intersection points of contact; determining normal and tangential unit vectors using the calculated midpoint; determining intersection points between a line extending in both directions of the normal vector line and the boundaries of the two particles; approximating an overlap distance between the two particles based on the intersection points between a line extending in both directions of the normal vector line and the boundaries of the two particles; and quantifying the magnitude of contact using the overlap distance between the two particles; determining normal forces and associated moments based upon the contact points and the magnitude of the contact between the at least two particles using the processing system by: determining a normal elastic stiffness for a contact between two particles; determining a contact damping parameter for the contact between the two particles; calculating a normal component of relative velocity with respect to the two particles; calculating a normal force using the normal elastic stiffness, contact damping parameter, and normal component of relative velocity for each of the two particles; and computing a moment arm for each of the two particles; and calculating an associated moment due to the calculated normal force for each of the two particles; determining tangential forces and associated moments based upon the contact points and the magnitude of the contact between the at least two particles using the processing system by: determining angular velocities for each of the two particles; calculating a relative tangential velocity for each of the two particles; calculating an increment in tangential force using the relative tangential velocity for each of the two particles; calculating a tangential force at a discrete time state using the calculated increment in tangential force for each of the two particles; and calculating an associated moment due to the tangential force for each of the two particles; and performing mechanical analysis of the particulate system based on the contact between the at least two particles and the resulting forces and associated moments using the processing system.

Still another further embodiment of the method of the invention includes: generating a Non-Uniform Rational Basis Spline (NURBS) description for the particle morphology of each of a plurality of particles within a particulate system in three dimensions using a processing system, where the NURBS description of a given particle within the particulate system includes a plurality of control points that define a control polygon bounding the geometry of a NURBS curve, a knot vector that determines the location of a plurality of knots, a basis function of a predetermined degree that determines the number of control points that influence any given point on the NURBS curve, and a plurality of weights that determine the effective contribution of a control point on the overall shape of the NURBS curve; determining contact points between at least two particles within the particulate system based on the NURBS description for the particle morphology of the at least two particles using the processing system; determining a magnitude of the contact between the at least two particles within the particulate system based on the NURBS description for the particle morphology of the at least two particles using the processing system by identifying pairs of intersecting portions of the surfaces of two particles based on the NURBS descriptions of the particle morphology of the two particles; determining a closed intersection loop for the intersecting portions of the surfaces of two particles; approximating a loop centroid and a loop normal for the closed intersection loop; determining contact points between a line through the loop centroid extending in the direction of the loop normal and the surfaces of each of the two particles; calculating an overlap distance between the two particles based on the contact points between the line through the loop centroid extending in the direction of the loop normal and the surfaces of each of the two particles; and quantifying the magnitude of contact based on the overlap distance between the two particles; determining normal forces and associated moments based upon the contact points and the magnitude of the contact between the at least two particles using the processing system by: determining a normal elastic stiffness for a contact between two particles; determining the overlap distance between the two particles; calculating a normal force for each of the two particles using the normal elastic stiffness and the overlap distance between the two particles; and calculating an associated moment due to the calculated normal force for each of the two particles; determining tangential forces and associated moments based upon the contact points and the magnitude of the contact between the at least two particles using the processing system: determining angular velocities for each of the two particles; determining translational velocities for each of the two particles; calculating an increment in tangential force for each of the two particles; calculating a tangential force accounting for incremental rotation of the contact plane for each of the two particles; and calculating an associated moment due to the tangential force for each of the two particles; and performing mechanical analysis of the particulate system based on the contact between the at least two particles and the resulting forces and associated moments using the processing system.

DETAILED DESCRIPTION

Figure 1:
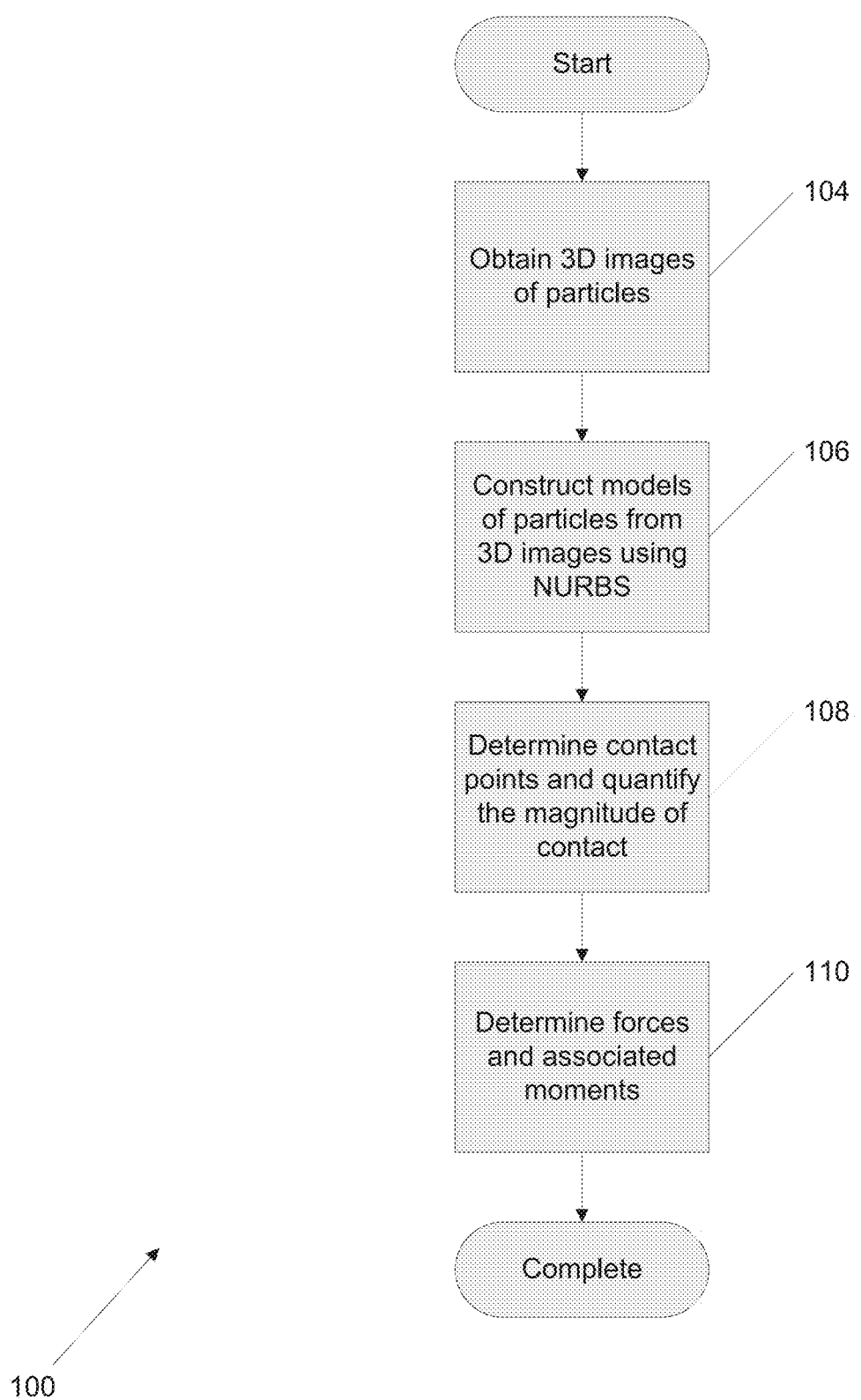
FIG. 1 is a flow chart illustrating a process for performing GEM based analysis of a particulate system in accordance with an embodiment of the invention.

Turning now to the drawings, systems and methods for granular element analysis of particulate systems using Non-Uniform Rational Basis-Splines (NURBS) to represent particle morphology in accordance with embodiments of the invention are illustrated. In many embodiments of the invention, a Granular Element Method (GEM) is utilized to analyze particulate systems. The GEM approach utilizes NURBS to represent complex particle geometries and numerically simulates the interactions of particulate systems based on Newtonian mechanics in a manner similar to that utilized in the Discrete Element Method (DEM). Unlike DEM methods that simplify particle shapes using spheres (or discs), ellipsoids, or polyhedral functions, GEM utilizes control points, a knot vector, basis function of a predetermined degree, and a plurality of weights to define NURBS curves and/or surfaces to define particle morphology. In various embodiments, these particle representations serve as a basis for DEM calculations. A GEM approach can readily apply in the context of 2D or 3D applications depending on the requirements of a specific application and/or the number of dimensions used to capture the original images. The NURBS representation of granular elements within a particulate system can be obtained from CT images of the particles within the particulate system. After characterizing the particles utilizing NURBS, various techniques can be used to determine contact points, forces, and moments between particles in contact. Systems and methods that utilize GEM are discussed further below, GEM is first described in the context of the analysis of particulate systems in 2D systems. Systems and methods that utilize GEM in the analysis of particulate systems in 3D are then discussed.

NURBS is a powerful modeling tool that is widely used in computer based graphics and design. A NURBS based approach allows for generating and representing complex curves and surfaces accurately using a plurality of control points that define a control polygon bounding the geometry of a NURBS curve, a knot vector that determines the location of a plurality of knots, a basis function of a predetermined degree that determines the number of control points that influence any given point on the NURBS curve, and a plurality of weights that determine the effective contribution of a control point on the overall shape of the NURBS curve. NURBS are efficiently handled by computer programs while allowing intuitive human interactions for determining curves and surfaces. Further, in a NURBS approach, curves and surfaces are represented with mathematical functions that can be used as the basis for further calculations and analysis.

Systems and methods that utilize GEM take full advantage of NURBS in the context of DEM based analysis. In analyzing a particulate system, accurate representation of the individual granular morphology of the particles is extremely important. A GEM approach utilizes NURBS to accurately represent granular morphology and utilizes the corresponding mathematical functions. In treating each particle as a discrete element, GEM further incorporates discrete element method based calculations in analyzing particulate systems.

An Overview of the Granular Element Method

In many embodiments of the invention, a GEM based approach utilizes NURBS to capture particle morphology with DEM calculations for analysis of particulate systems. A process for performing GEM in accordance with an embodiment of the invention is shown in FIG. 1. The process 100 includes obtaining (104) 3D images of particles using various methods including an X-ray CT based method or other methods known to one of ordinary skill in the arts. With the images, NURBS is used to construct (106) models of the particles by defining control points and a knot vector which will be further described below. The NURBS representation of the particles are analyzed (108) to determine contact points between overlapping particles and to quantify the magnitude of contact. The process of determining contact points and quantifying the magnitude of contact will be further described below. Forces and associated moments are determined (110) as further described below and the GEM process is complete. Although specific processes for performing GEM by describing particle morphology using NURBS and analyzing the described particles using processes similar to those utilized in DEM are discussed above with respect to FIG. 1, any of a variety of processes for performing DEM calculations utilizing particles described using NURBS as appropriate to the requirements of a specific application can be utilized in accordance with embodiments of the invention. Processes for representing particle morphology using NURBS in accordance with embodiments of the invention are discussed further below.

An Overview of Non-Uniform Rational Basis-Splines

NURBS is a technique for representing surfaces that was developed for use in computer graphics, computer-aided design (CAD), computer-aided engineering (CAE), and computer-aided manufacturing (CAM) systems, and even computer animations. These functions provide great flexibility in representing arbitrary and complex geometries with much less information than conventional faceted or polynomial counterparts. Further, the mathematical properties of NURBS make them ideal candidates for the description of particle morphology, the integration of discrete equations of motion, and the detection of contact. Below, NURBS is further described in the context of 2D and 3D systems.

Basis-Splines (BS)

Three elements are typically used to describe Basis-Splines (LB-Splines):

1. A set of n+1 control points $P_i$ (0≤i≤n),
2. A knot vector U of m−1 knots (0=$u_0$≤$u_1$≤ . . . ≤$u_{m-1}$≤$u_m$=1), and
3. A degree p satisfying m=n+o where o=p+1 is the order of the curve.

Note that the last requirement means that the number of knots m+1 is equal to the number of control points n+1 plus the curve order p−1. The control points need not lie on the curve itself. Rather, control points act as a scaffold that controls the geometry. At the most rudimentary level, one manipulates the geometry by adjusting the control points until the desired shape is met. Piecewise linear interpolation of the control points effectively furnishes a control polygon bounding the geometry.

Given the aforementioned parameters, a (non-rational, polynomial) B-Spline curve is defined parametrically such that $$C(u) = \sum_{i=0}^{n} N_{i,p}(u) P_i \qquad (1)$$

where u is the curve parameter, and $N_{i,p}$ is the i-th B-Spline basis function of degree p defined recursively as follows:

$$N_{i,0}(u) = \begin{cases} 1 & \text{if } u \in [u_i, u_{i+1}) \\ 0 & \text{otherwise} \end{cases} \qquad (2)$$

$$N_{i,p}(u) = \frac{u - u_i}{u_{i+p} - u_i} N_{i,p-1}(u) + \frac{u_{i+p+1} - u}{u_{i+p+1} - u_{i+1}} N_{i+1,p-1}(u)$$

The above is also known as the Cox-de Boor recursion formula.

Rational B-Splines (RBS)

A known limitation of (non-rational) B-Splines, as defined in equation (1), is their inability to capture conic sections (e.g., circles and ellipses). This limitation stems from the simple polynomial form of B-Splines. To be able to represent conic sections, the parametric form would need to be rational, i.e., the quotient of two polynomials. A rational B-Spline (RBS) is furnished by adding a weight $w_i \geq 0$, which provides an additional degree of freedom for geometry manipulation. Hence, the curve equation becomes $$C(u) = \frac{1}{\sum_{i=0}^{n} N_{i,p}(u) w_i} \sum_{i=0}^{n} N_{i,p}(u) w_i P_i \qquad (3)$$

$$= \sum_{i=0}^{n} R_{i,p}(u) P_i$$

where $R_{i,p}(u) = N_{i,p}(u) w_i / (\Sigma_{i=0}{}^n N_{i,p}(u) w_i)$, $0 \leq i \leq n$, are the rational basis functions. Since $R_{i,p}(u)$ is rational, the exact description of conic sections becomes possible. Naturally, when all weights are equal to unity, equation (3) reduces to equation (1).

The weight $w_k$ affects the effective contribution of control point $P_k$ on the overall shape of the curve C(u). Making $w_k$ smaller corresponds to "pushing" the curve away from the control point $P_k$. In the extreme, when $w_k=0$, the term $w_k P_k$ is eliminated from the equation of the curve and the contribution of the control point is obviously nullified. Another extreme is obtained by making $w_k$ very large relative to other weights. Dividing equation (3) by $w_k$ gives $$C(u) = \frac{\sum_{i \neq k}^{n} N_{i,p}(u) w_i / w_k P_i + N_{k,p}(u) P_k}{\sum_{i \neq k}^{n} N_{i,p}(u) w_i / w_k + N_{k,p}(u)} \qquad (4)$$

where as $w_k$ is increased, the curve C(u) is "pulled" towards the control point $P_k$.

Non-Uniform (NU) Rational B-Splines (NURBS)

The NU portion in NURBS is furnished by the knots in the knot vector U of the B-Splines. The non-decreasing knots $u_i$, $i=0, 1, \ldots, m$ partition the parameter space into segments of half-open intervals $[u_i, u_{i+1})$, which are also called knot spans. The knot span can be of zero length since the knots need not be distinct, i.e., they can be repeated. The number of times a knot value repeats itself is called multiplicity k. Based on the way the knots are spaced, the B-Splines can be divided into the following types:

1. Uniform B-Splines, which can be subdivided into non-periodic and periodic
2. Non-uniform B-Splines In non-periodic uniform B-Splines, the knots are uniformly spaced except at the ends where the knot values are repeated p+1 times so that $$U = \{\underbrace{0, 0, \ldots, 0}_{p+1}, u_{p+1}, \ldots, u_{m-p-1}, \underbrace{\alpha, \alpha, \ldots, \alpha}_{p+1}\} \qquad (5)$$

The above knots are also referred to as non-periodic or open knots. Non-periodic B-Splines are infinitely continuously differentiable in the interior of a knot span, and (p−k)-times continuously differentiable at a knot. If k=p, the knot has full multiplicity; the multiplicity cannot be greater than the degree. Multiplicity of knots provides a way to specify the continuity between segments. For example, a full multiplicity knot in the knot vector (away from the ends) means that a kink or cusp is present in the curve. On the other hand, in uniform periodic B-Splines, the knots are uniformly spaced but the first and last knots are not duplicated so that the knot vector looks like $$U = \{0, 1, \ldots, n\} \qquad (6)$$

Periodic B-Splines are everywhere (p−1)-times continuously differentiable.

If the knots are unequally spaced, the knot vector is non-uniform. Accordingly, the property of unequally spaced knots is a typical characteristic of non-uniform B-Splines (the NU part in NURBS). The non-uniformity in knots can cause the degree p of the curve to be different between knot spans. As a matter of terminology and in describing particle geometries, knot vectors can be defined in either [0, 1] or [0, n]. The choice of normalization does not have any effect on the shape of the curve, and it is therefore inconsequential. Equation (3) is usually taken as the definition of NURBS although the non-uniformity of the knots is not obvious from this expression.

Closing a NURBS Curve

Typically, NURBS curves are closed when describing particle surfaces. There are at least two procedures to close a NURBS curve. In the first procedure, closed NURBS curves are defined by 'wrapping' control points. In this process, a uniform knot sequence of m+1 knots is constructed such that: $u_0=0, u_1=1/m, u_2=2/m, \ldots, u_m=1$. Note that the domain of the curve is $[u_p, u_{n-p}]$. Then, the first and last p control points are wrapped so that $P_0=P_{n-p+1}, P_1=P_{n-p+2}, \ldots, P_{p-2}=P_{n-1}$ and $P_{p-}=P_n$. By grapping the control points, $C^{p-1}$ continuity is ensured at the joining point $C(u_p)=C(u_{n-p})$.

In the second approach, the first and last control points are made coincident, i.e., $P_0=P_n$ and the first and last p+1 knots are clamped, i.e., repeated. The curve may or may not have $C^k$ continuity depending on how the first and last k internal knot spans are chosen, and the first and last k+1 weights and control points are chosen. Perhaps the simplest example is that of a unit circle in which the control points and weights shown in Table 1 are used together with the following knot vector $$U=\{0,0,0,1,1,2,2,3,3,4,4,4\} \quad (7)$$

Note that $P_0=P_8$ and the first and last three knot values are clamped. Also, there are three pairs of internal knots with multiplicity two. In general, this would lead to a loss of continuity in the first derivative. However, in this case, continuity in the first derivative is maintained by three collinear control points in each of the following sets: $\{P_7,P_0=P_8,P_1\}$, $\{P_1,P_2,P_3\}$, $\{P_3,P_4,P_5\}$, and $\{P_5,P_6,P_7\}$.

TABLE 1

Control points $(x_i, y_i)$ and weights $w_i$ for a unit circle.

| i | $x_i$ | $y_i$ | $w_i$ |
|---|---|---|---|
| 0 | 1 | 0 | 1 |
| 1 | 1 | 1 | $\sqrt{2}/2$ |
| 2 | 0 | 1 | 1 |
| 3 | −1 | 1 | $\sqrt{2}/2$ |
| 4 | −1 | 0 | 1 |
| 5 | −1 | −1 | $\sqrt{2}/2$ |
| 6 | 0 | −1 | 1 |
| 7 | 1 | −1 | $\sqrt{2}/2$ |
| 8 | 1 | 0 | 1 |

Rendering Particle Morphology Using NURBS

Figure 2A:
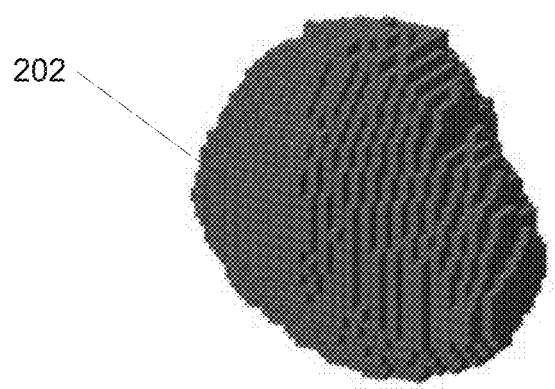
FIGS. 2A-2C are illustrations showing a sand particle imaged with 3D X-ray CT with thousands of voxels to a functional representation using NURBS in accordance with an embodiment of the invention.
Figure 2B:
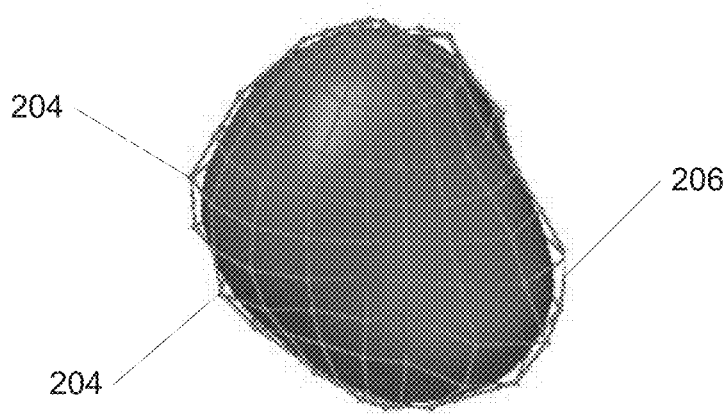
Figure 2C:
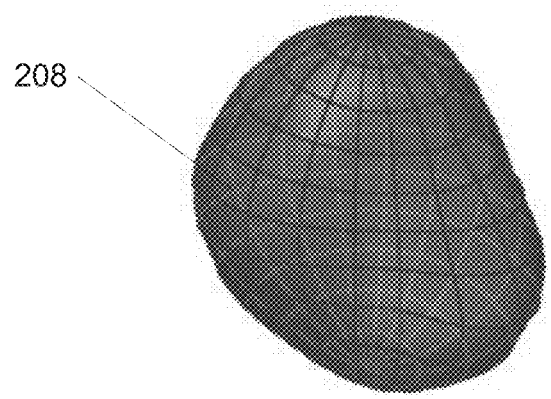

The process of describing particle morphology using NURBS involves obtaining information concerning the surface of the particle, which in many embodiments is obtained using 3D X-ray CT, and defining control points and knot vectors that capture the detail of the surface of the particle. The process of describing the morphology of a particle using NURBS based upon an image generated using 3D X-ray CT of the particle in accordance with an embodiment of the invention is illustrated in FIGS. 2A-2C. The imaged sand particle 202 is constructed with thousands of voxels where the accuracy of the construction depends on the resolution of the voxels. NURBS technology uses control points 204 and may create a scaffolding 206 as an intermediate step in constructing a model of the obtained image. Using the control points, NURBS techniques are able to create a smooth functional representation of the particles granular morphology 208. The process of constructing functional representation using NURBS of obtained images is further described below. Although specific examples of particle morphology and NURBS representations are discussed above with respect to FIGS. 2A-2C, any of a variety of particles, processes for obtaining particle images, and NURBS representations can be utilized in accordance with embodiments of the invention.

Figure 3:
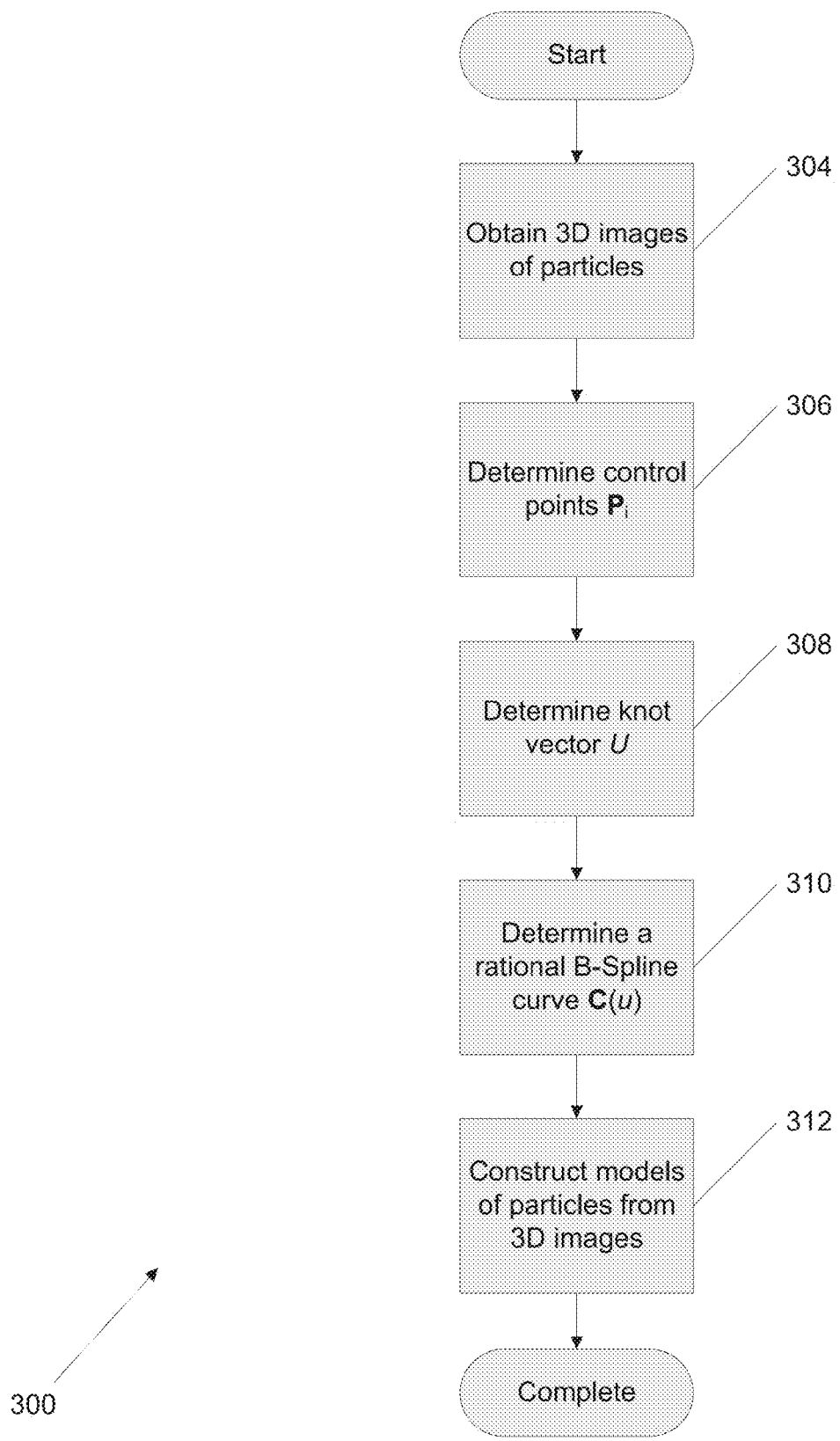
FIG. 3 is a flow chart illustrating a process for constructing models of particles from 3D images using NURBS in accordance with an embodiment of the invention.

A process that can be utilized to describe the surface of a particle based upon information obtained from a 3D X-ray CT in accordance with an embodiment of the invention is illustrated in FIG. 3. The process 300 includes obtaining (304) 3D images of the particles (similar to the image of the particle shown in FIG. 2A) and determining (306) control points $P_i$. The control points can be obtained from digital data of a particle's surface by either manually entering the obtained images into a computer aided design software and manipulating the surface manually to match the surface data of the image. The control points may also be obtained in an automated fashion by using optimization techniques such as least squares fitting, gradient-based optimization algorithms, and machine learning techniques for image processing. Based upon the control points, a knot vector U is determined (308) that describes the surface of the particle. Based upon the control points and factoring in weights $w_i \geq 0$, a rational B-Spline curve C(u) can be determined (310). The rational B-Spline curve C(u) and knot vector U may be further utilized to construct (312) models of particles from the 3D images in accordance with some embodiments of the invention. Although specific processes for obtaining 3D images, determining control points, and constructing NURBS representations of 3D images are discussed above with respect to FIG. 3, any of a variety of processes may be utilized to form NURBS representations of particle morphology as appropriate to the requirements of a specific application in accordance with embodiments of the invention. Processes for determining contact points and the magnitude of contact are discussed further below.

Determining Contact Points and Quantifying the Magnitude of Contact

Figure 4:
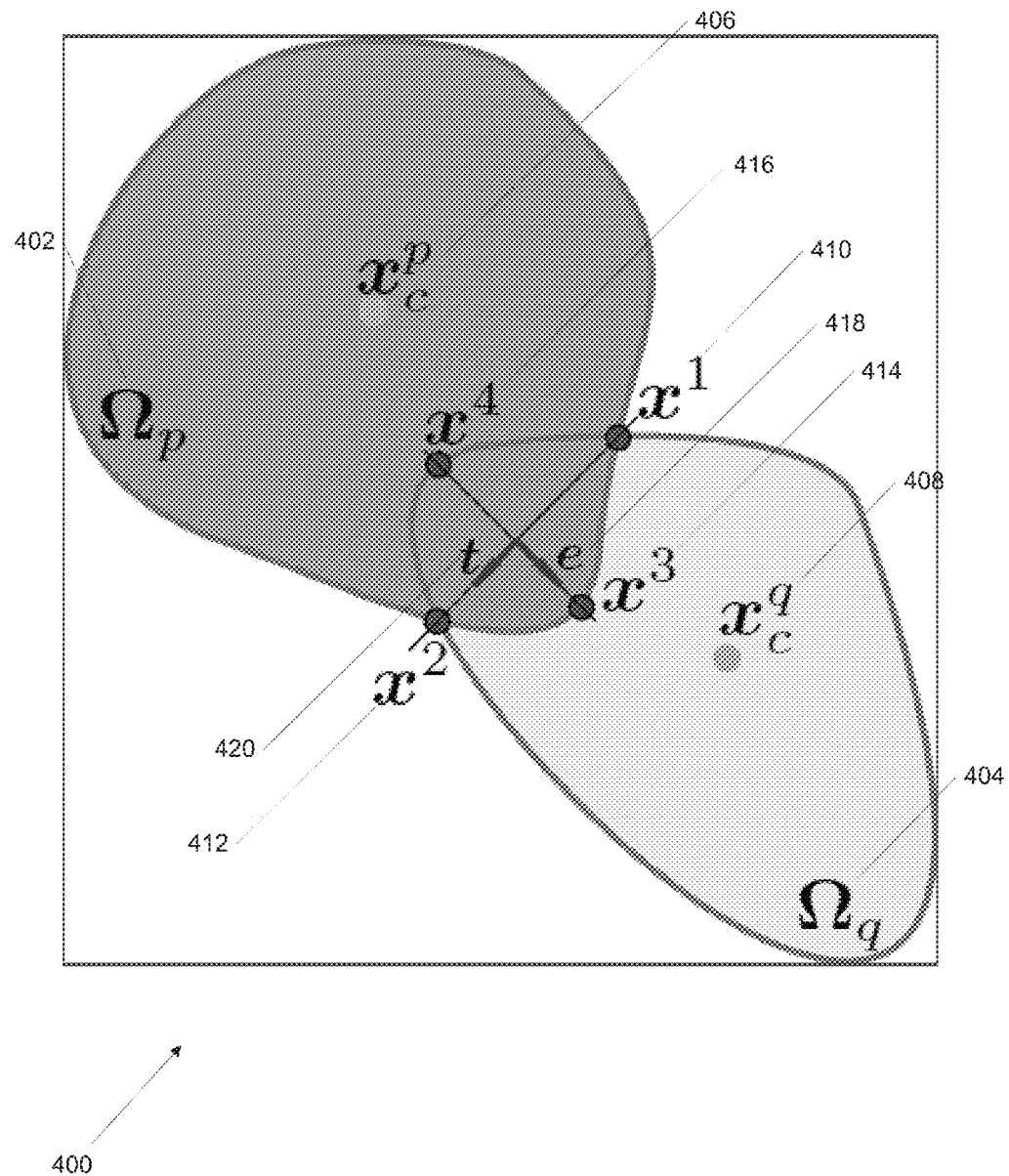
FIG. 4 is an illustration of two particles in contact showing interpenetration (overlapping) in accordance with an embodiment of the invention.

Contact between two particles may be detected from observing spatial overlap between two particles. A process for determining contact points between two NURBS representations of particles and for quantifying the magnitude of the contact in accordance with an embodiment of the invention is illustrated in FIG. 4. Two particles, $\Omega_p$ (402) and $\Omega_q$ (404), are in contact at a particular instant in time. Particle position is given by the centroid, with particles $\Omega_p$ (402) and $\Omega_q$ (404) having centroids located at $x_c^p$ (406) and $x_c^q$ (408), respectively. The points of contact are defined as the two intersection points $x^1$ (410) and $x^2$ (412). A local coordinate system (in 2D for simplicity) is adopted, where the normal direction (at the point of contact) is given by the unit vector e (418), pointing away from particle $\Omega_p$ (402) and the tangential direction furnished by the unit vector t (420), which would induce a clockwise rotation of vector e (418). Further, changes in angular position θ are assumed positive if they induce a counter-clockwise rotation of the particle, relative to the particle's centroid. Similarly, positive moments are assumed to induce positive rotations.

Figure 5:
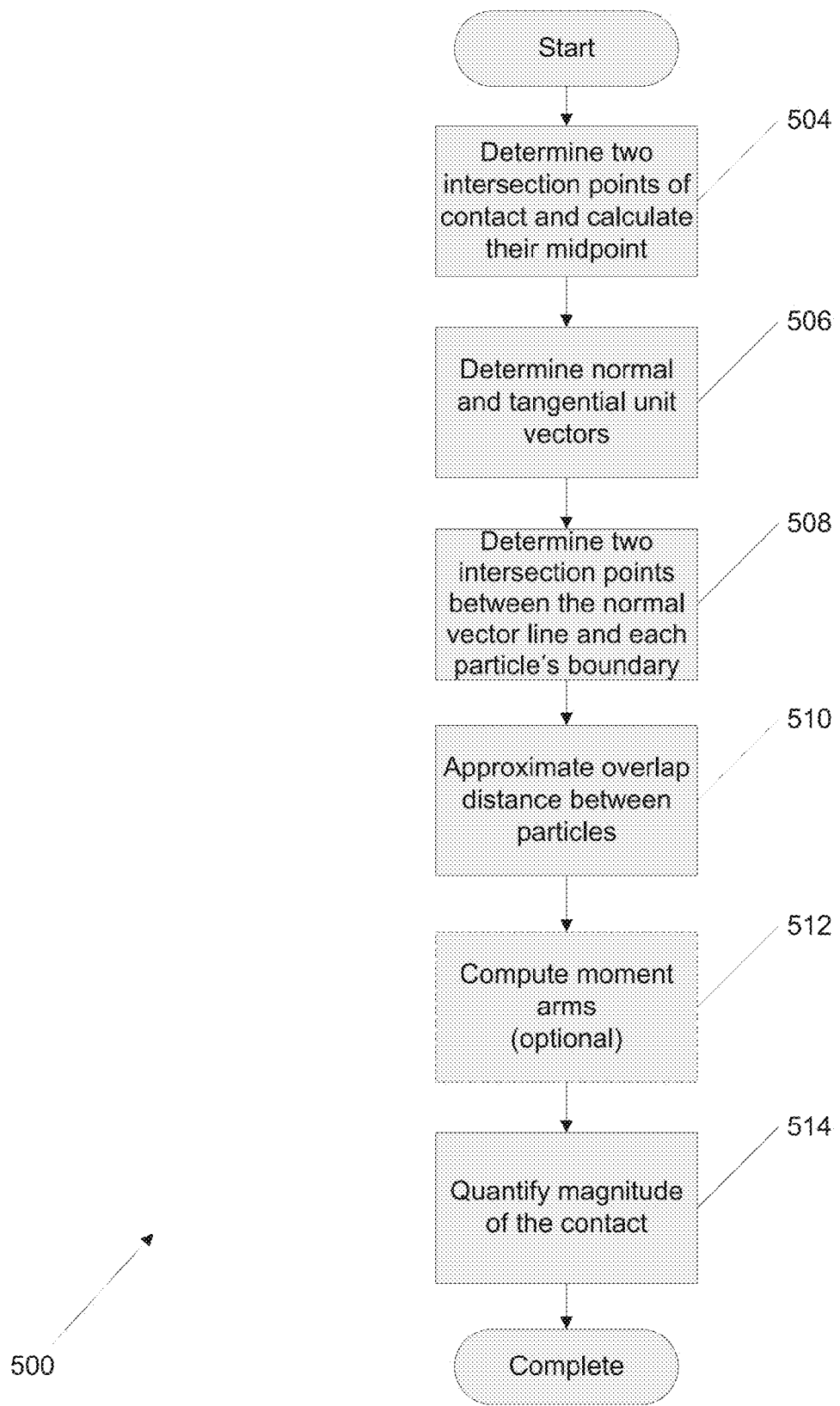
FIG. 5 is a flow chart illustrating a process for quantifying the magnitude of contact between two particles in contact in 2D systems in accordance with an embodiment of the invention.

A process that can be utilized to quantify the magnitude of contact between two particles described using NURBS representations in accordance with an embodiment of the invention is illustrated in FIG. 5 and described below in reference to FIG. 4 for illustrative purposes. The process (500) includes determining (504) two intersection points $x^1$ (410) and $x^2$ (412), and calculating the midpoint $x^m$ such that $x^m = \frac{1}{2}(x^1 + x^2)$. The process uses the intersection points and the calculated midpoint to determine (506) the normal and tangential unit vectors, e (418) and t (420) respectively. The tangential vector (420) can be defined such that $t=(x^2-x^1)/\|x^s-x^1\|$ and e·t=0 can be used to obtain e (418). Both unit vectors define a basis centered at $x^m$. By extending a straight line in either directions of e (418) until intersecting with the boundaries of particles $\Omega_p$ (402) and $\Omega_q$ (404), two additional intersection points can be determined (508), shown as points $x^4$ (416) and $x^3$ (414) respectively, in FIG. 4. The overlap distance Δn between particles $\Omega_p$ (402) and $\Omega_q$ (404) can be approximated (510) such that $\Delta n=\|x^4-x^3\|$. Further, the moment arms $R^p$ and $R^q$ can be computed (512) where $R^p=x^3-x_c^p$ and $R^q=x^4-x_c^q$. Based on contact and the spatial overlap between particles, the magnitude of contact may be quantified (514). Although specific processes for determining contact points and quantifying the magnitude of contact of two particles described using NURBS representations are discussed above with respect to FIGS. 4 and 5, any variety of processes similar to those utilized in determining contact points and quantifying the magnitude of contact of two particles described using NURBS representations can be utilized as appropriate to the requirements of a specific application in accordance with embodiments of the invention. Processes for calculating forces and associated moments of contacting particles described using NURBS representations are further described below.

Determining Normal Forces and Associated Moments

Figure 6:
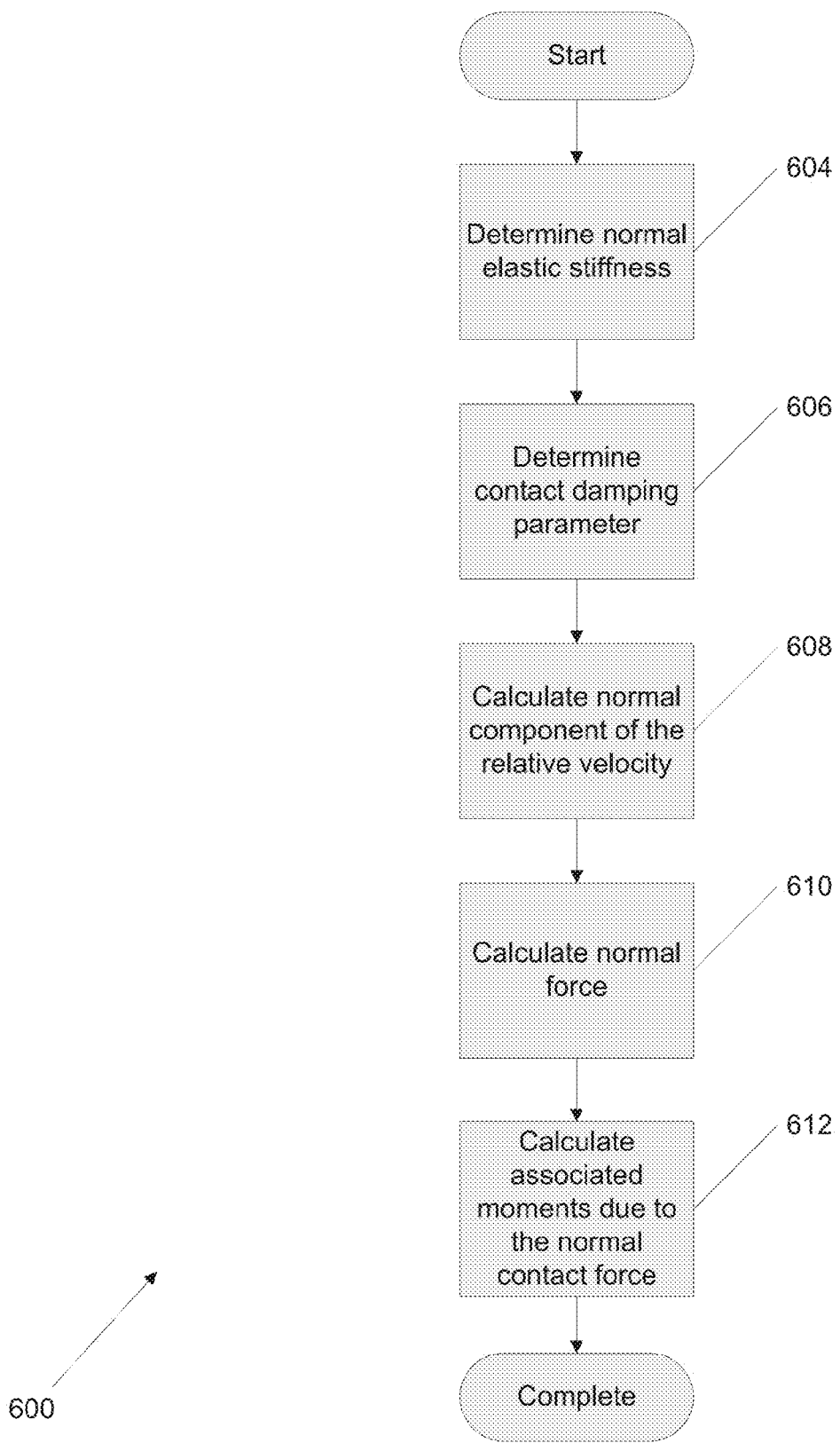
FIG. 6 is a flow chart illustrating a process for calculating normal force and associated moments in 2D systems in accordance with an embodiment of the invention.

The normal force $F_n$ is exerted on particle p, in the $-e$ direction and exerted on $\Omega_q$ in the e direction, exploiting action and reaction. A process for determining the normal force and associated moments of two particles described using NURBS representations in accordance with an embodiment of the invention is shown in FIG. 6. The normal elastic stiffness $k_n$ is determined (604) using techniques that are well known in the art including, but not limited to, using experiments or estimated as a function of the material properties (Young's modulus and Poisson ratio). The β is also determined (606) using techniques that are well known in the art including, but not limited to, measurements from relevant experiments. The normal component of the relative velocity of particle $\Omega_p$ relative to particle $\Omega_q$ can be calculated (608) so that $$\dot{n} = (\dot{x}_c^q - \dot{x}_c^p) \cdot e \qquad (8)$$

Utilizing $k_n$, β, and $\dot{n}$, the effective normal force can be calculated (610) using a linear elastic stiffness model such that $$F_n = k_n(\Delta n + \beta \dot{n}) \qquad (9)$$

The moments $M_n^p$ and $M_n^q$ due to the excentricity of the normal force as exerted on the centroid of particles $\Omega_p$ and $\Omega_q$, respectively, can be calculated (612) such that $$M_n^p = -F_n R_s^p \text{ and } M_n^q = f_n R_s^q \qquad (10)$$

where $R_s^p = R^p \cdot t$ is the tangential component of the $R^p$ moment arm, and $R_s^q = R^q \cdot t$ is the tangential component of the $R^q$ moment arm.

Determining Tangential Forces and Associated Moments

Figure 7:
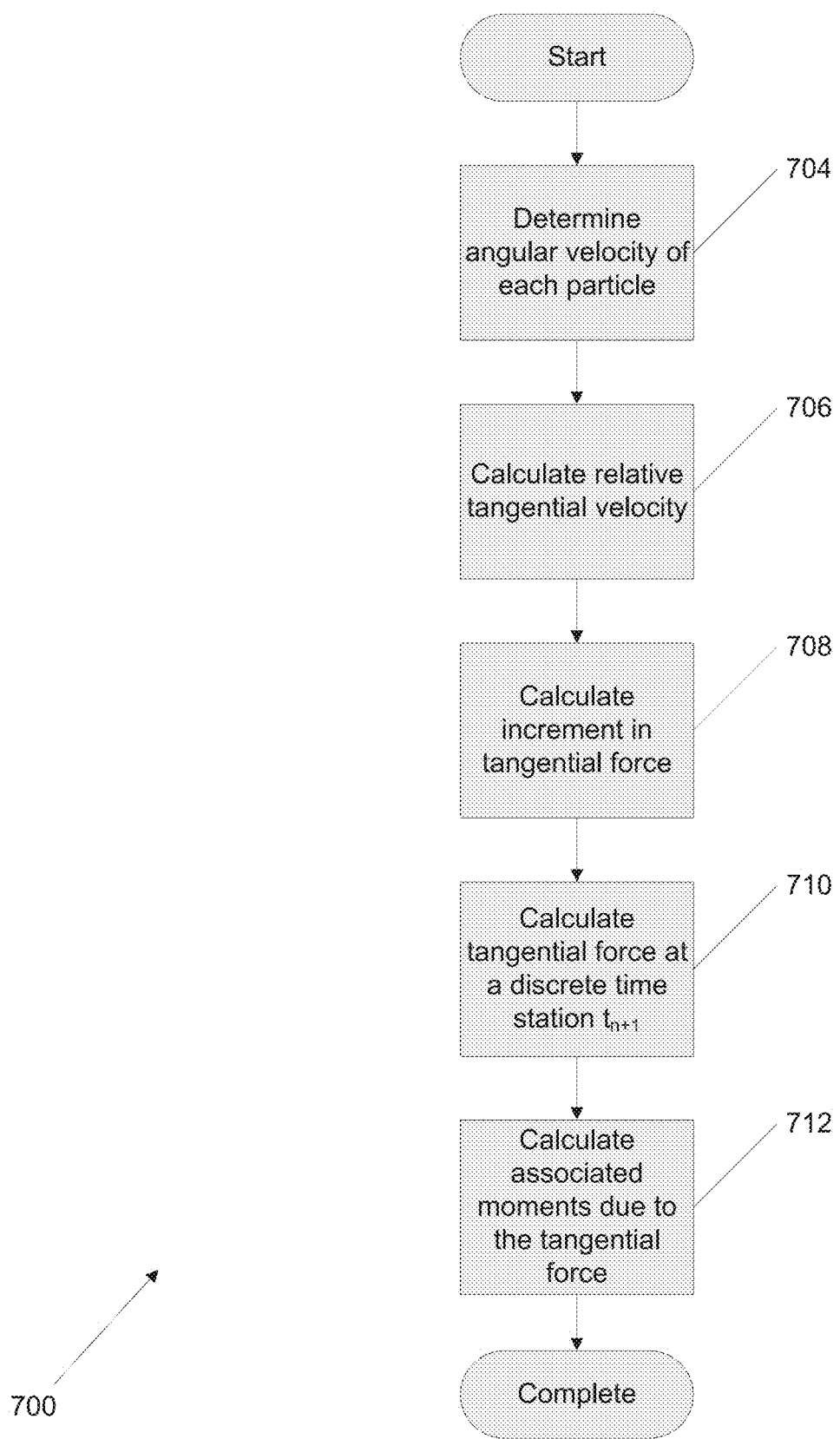
FIG. 7 is a flow chart illustrating a process for calculating tangential force and associated moments in 2D systems in accordance with an embodiment of the invention.

The incremental tangential forces can be calculated using the friction model where the tangential stiffness is initialized at time of first contact and exists until the grains separate. A process for determining the tangential forces and associated moments experienced by two contacting particles described using NURBS representations in accordance with an embodiment of the invention is shown in FIG. 7. The angular velocities, $\omega^p$ and $\omega^q$, of particles $\omega_p$ and $\omega_q$, respectively are determined (704). The relative tangential velocity $\dot{s}$ of particle $\omega_p$ with respect to particle $Q_q$ is calculated (706) so that $$\dot{s} = (\dot{x}_c^p - \dot{x}_c^q) \cdot t - (\omega^p R_s^p + \omega^q R_s^q) \qquad (11)$$

Naturally, $\Delta s = \dot{s} \Delta t$ and the relative velocity $\dot{s}$ is taken as positive when pointing in the t direction and negative if it points in the $-t$ direction. Using $\dot{s}$, the increment in tangential force is calculated (708) such that $$\Delta F_s = k_s(\Delta s + \beta \dot{s}) \qquad (12)$$

At a discrete time station $t_{n+1}$ the tangential force $F_s$ is then calculated (710) according to $$F_s = F_s^n + \Delta F_s \qquad (13)$$

where $F_s^n$ is the value of the tangential force at time station $t_n$. Ultimately, the tangential force is limited according to Coulomb-friction law so that $$F_s = \min(F_s, \mu F_n + c) \qquad (14)$$

where μ is the interparticle friction coefficient of friction and c is the interparticle cohesion. The tangential force is applied on grains $\Omega_p$ and $\Omega_q$ in the directions $-t$ and $t$, respectively, for $\dot{s} > 0$, and in the opposite directions otherwise.

Similar to the normal component of the contact force, the tangential component of the force can exert moments with respect to the centroids of the particles in contact. The resulting moments $M_s^p$ and $M_s^q$ are calculated (712) such that $$M_s^p = F_s R_n^p \text{ and } M_s^q = -F_s R_n^q \qquad (15)$$

where $R_n^p = R^p \cdot e$ is the normal component of the $R^p$ moment arm and $R_n^q = R^q \cdot e$ is the normal component of the $R^q$ moment arm. Although specific processes for determining forces and associated moments are discussed above with respect to FIGS. 6 and 7, any of a variety of processes for determining forces and associated moments of contacting particles described using NURBS representations can be utilized as appropriate to the requirements of a specific application in accordance with embodiments of the invention. Further, the techniques for determining contact forces and moments presented above correspond to classic and simple linear models. This is done for simplicity of presentation. However, the NURBS formulation presented can be extended to nonlinear contact models that exploit local information such as curvature, normal and tangential vectors, and non-convexity. Processes for using NURBS based representation of particle morphology in 3D in accordance with an embodiment of the invention is discussed below.

Three-Dimensional GEM

The modeling of particulate systems using techniques in which forces and moments are determined in 2D for particles described using NURBS representations are discussed above. In 2D based GEM applications, particle morphology can be accurately represented using NURBS by utilizing a mathematical representation for curves of the particle's surface as defined by equation (1) above and combined with appropriate knot vectors. The DEM techniques utilized in 2D based GEM systems can further be adapted to enable the analysis of particulate systems in 3D using particles described using NURBS representations.

In modeling of particulate systems using techniques in which forces and moments are determined in 3D for particles described using NURBS, a 'NURBS tensor product surface' P(s,t) can be defined such that $$P(s, t) = \sum_{i=0}^{m} \sum_{j=0}^{n} \left( \frac{w_{i,j} N_{i,p}(s) N_{j,p}(t)}{\sum_{g=0}^{m} \sum_{h=0}^{n} w_{gh} N_{g,p}(s) N_{h,p}(t)} \right) P_{i,j} \qquad (16)$$

where $P_{ij}$ are the control points, $w_{ij}$ are the weights, and $N_{i,p}(s)$ and $N_{j,p}(t)$ are the B-Splines univariate basis functions of degree p, which define the tensor product. For most cases, particle surfaces are adequately described as a bicubic patch p=3. The control points define a control grid or mesh where the particle is enclosed in the convex hull of the control points. In defining a NURBS surface in 3D, typically a knot vector is specified for the s basis functions, and a second knot vector is specified for the t basis functions. The operations in 2D on NURBS curves such as knot insertion, as described above, can be extended directly as operations on 3D NURBS surfaces by operating simply on each of the control curves. Thus, to insert a knot into the s knot vector for a NURBS surface, the knot can be inserted into each s-control curve of the NURBS surface. In many embodiments, knot vectors that are clamped (or non-periodic) are used with l+p+1 knot values where l is the number of control points in each parametric direction (m+1 or n+1). However, alternative methods can be used to close a NURBS surface including those described above.

With a NURBS surface defined as a tensor product given by equation (16), the control points typically lie topologically in a rectangular grid. Thus, a closed surface representation using a single NURBS patch may not be possible without generating singularities at two poles where multiple control points collapse to a single point. These singularities can lead to difficulties when performing contact detection in parametric space and a multipatch approach to representing the particles may be beneficial. The discussion below uses six NURBS patches to construct particle morphology as an attempt to strike a balance between simplicity and accuracy. However, more or less NURBS patches may be utilized in constructing 3D models of particle morphology as appropriate to the requirements of a specific application in accordance with embodiments of the invention.

Determining Contact Points in 3D

Processes for determining contact between two particles represented using NURBS in 3D can be implemented using an intersection based approach. However, NURBS surface-surface (3D) intersection is a non-trivial problem and the associated techniques are significantly more complicated and computationally demanding than those in spline curve-curve (2D) intersection as discussed above. For designing the contact procedure in 3D GEM, a subdivision approach to detecting the intersection loop may provide a reasonable balance between accuracy and robustness, especially across multiple seams in a NURBS based multipatch representation of particles.

Figure 8A:
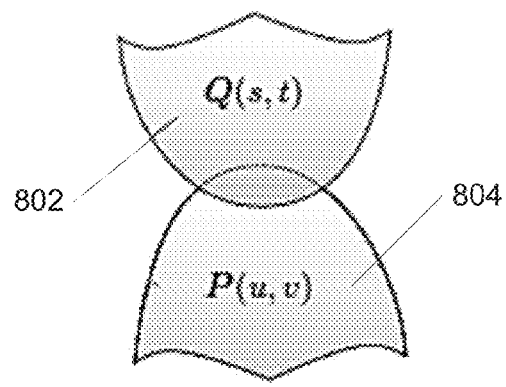
FIGS. 8A-8E are illustrations of the schematic of steps involved in surface-surface intersection analysis in 3D systems in accordance with an embodiment of the invention.
Figure 8B:
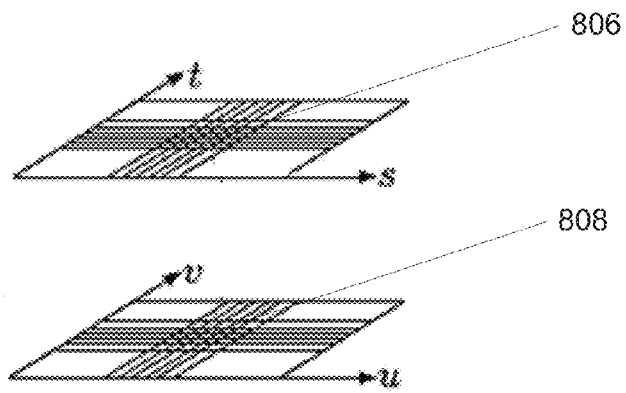
Figure 8C:
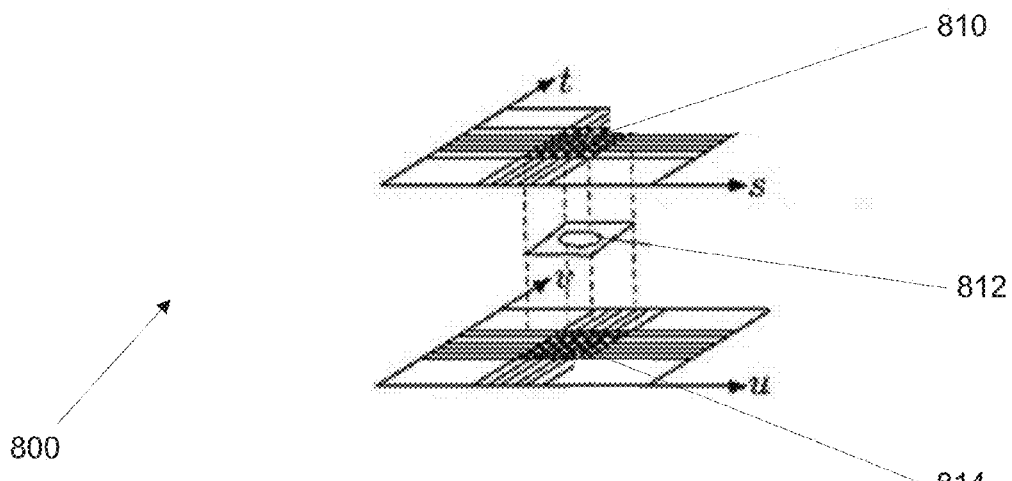
Figure 8D:
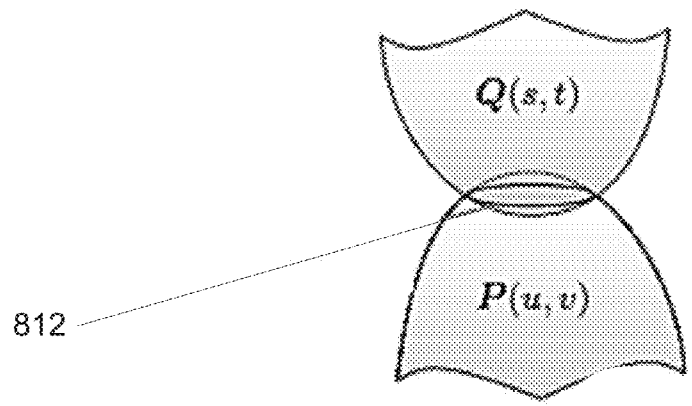
Figure 8E:
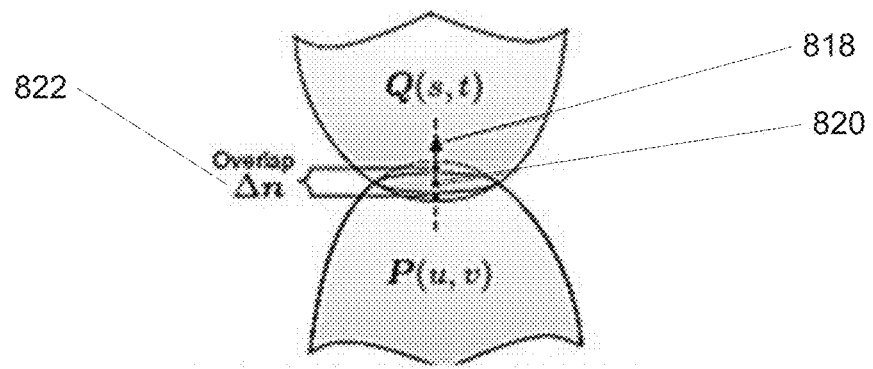

An intersection based process for determining contact and quantifying the magnitude of contact between particles described in 3D using NURBs in accordance with an embodiment of the invention is conceptually illustrated in FIGS. 8A-8E. Potentially intersecting NURBS surfaces (802) and (804) in real space are shown in FIG. 8A. The NURBS surfaces are subdivided in parametric space by refining the knot vectors in both parametric directions (e.g., s and t), using the knot insertion procedures described above. The subdivision procedure is repeated until a pre-specified tolerance for surface flatness, described in parametric space, is reached. Once the predetermined tolerance is reached, the flat surfaces (806) and (808) are defined, as shown in FIG. 8B. The surfaces (806) and (808) are 'discretized' using triangles to approximate the intersection loop and thus the flat surfaces are converted to surfaces of triangles (810) and (814), as shown in FIG. 5C. The discretization to triangles furnishes a means to perform surface-to-surface intersection by means of triangle-triangle intersection procedures. A convex hull is applied on the set of midpoints of all the collected (disjoint) intersection curves to form a closed polygon approximating the intersection loop (812), as shown in FIGS. 8C and 8D. Using the intersection loop (812), the loop centroid (820), as shown in FIG. 8E, can then be approximated. To determine the contact point on each surface, a curve-surface intersection algorithm can be employed, with the curve passing through the loop centroid (820) and in the direction of the loop normal (818) as shown in FIG. 8E and further described below. Although specific processes for intersection algorithms in 3D are discussed above with respect to FIGS. 8A-8E, any of a variety of processes for determining contact between two particles represented using NURBS in 3D using an intersection based approach can be utilized as appropriate to the requirements of a specific application in accordance with embodiments of the invention.

Figure 9:
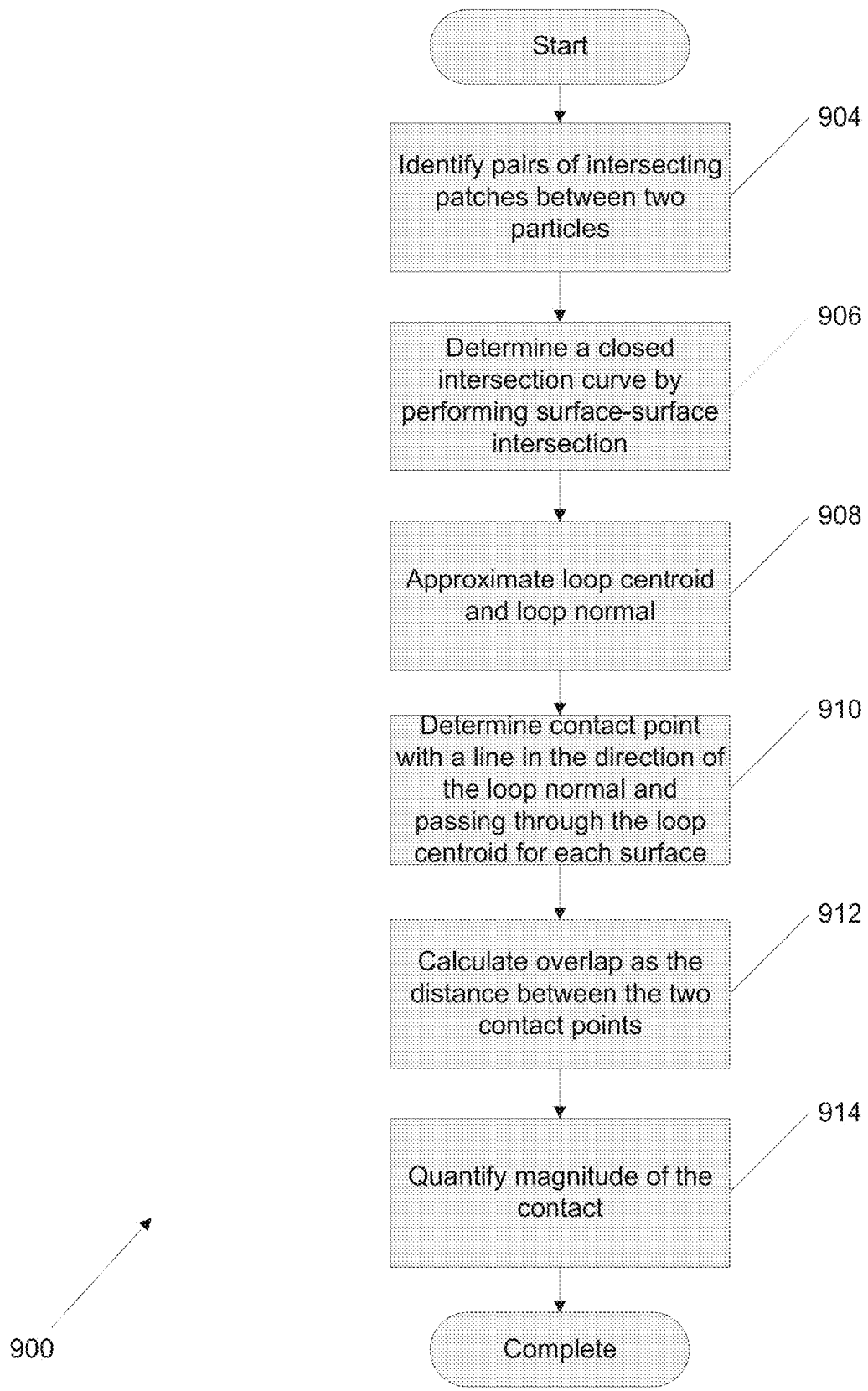
FIG. 9 is a flow chart illustrating a process for quantifying the magnitude of contact between two particles in contact in 3D systems in accordance with an embodiment of the invention.

A process that can be utilized to quantify the magnitude of contact between two particles described using a NURBS representation in 3D in accordance with an embodiment of the invention is illustrated in FIG. 9. For illustrative purposes, FIGS. 8A, 8D, and 8E are referenced in describing the process illustrated in FIG. 9. Consider two particles (802) and (804) that are potentially in contact with each other. The process (900) of determining contact and quantifying the magnitude of contact includes identifying (904) pairs of intersecting patches between the NURBS representations of two particles. The process uses the identified pairs of intersecting patches to determine (906) a closed intersection loop (816) by performing a surface-surface intersection analysis. Based on the closed intersection loop, the loop centroid (820) and loop normal (818) are approximated (908) where the contact normal is taken as the loop normal. For each surface, a contact point with a line in the direction of the loop normal and passing through the loop centroid is determined (910) by performing a curve-surface intersection. The overlap (822) is calculated (912) as the distance between the two contact points. Based on the calculated overlap between particles, the magnitude of contact may be quantified (914). Although specific processes for determining contact points and quantifying the magnitude of contact in 3D of two particles described using NURBS representations are discussed above with respect to FIGS. 8A-8E and 9, any variety of processes similar to those utilized in determining contact points and quantifying the magnitude of contact of two particles described using NURBS representations can be utilized as appropriate to the requirements of a specific application in accordance with embodiments of the invention. Processes for calculating forces and associated moments in 3D of contacting particles described using NURBS representations are further described below.

Determining Normal Force and Associated Moments in 3D

Figure 10:
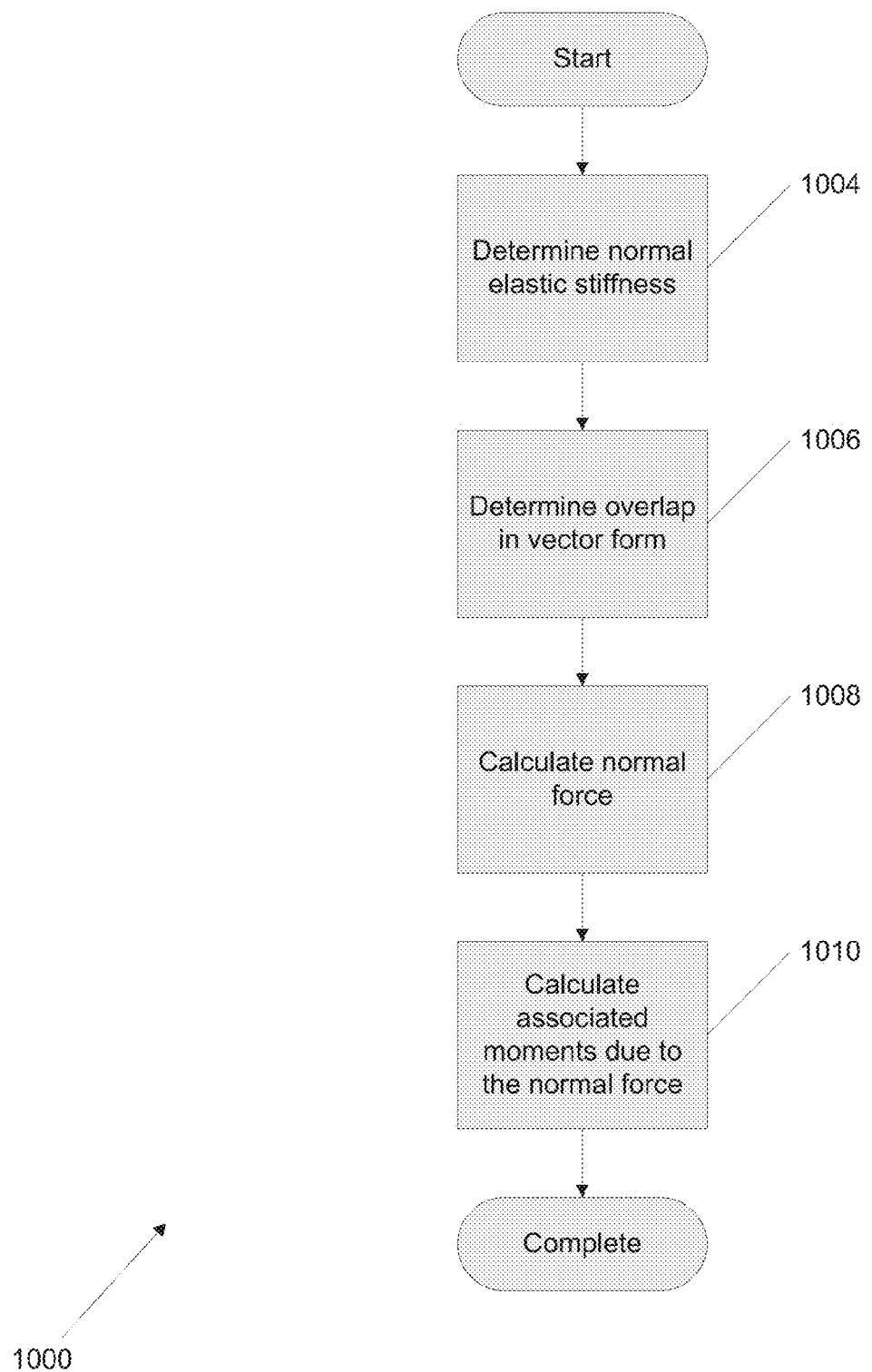
FIG. 10 is a flow chart illustrating a process for calculating normal force and associated moments in 3D systems in accordance with an embodiment of the invention.

Two particles in contact typically create normal forces such that the forces are equal and in opposite directions of each other. For illustrative purposes, we can label two NURBS representations of particles in 3D as $\Omega^p$ and $\Omega^q$. A process for determining the normal forces and associated moments of two particles, described using NURBS representations in 3D in accordance with an embodiment of the invention is shown in FIG. 10. The process 1000 includes determining (1004) the normal elastic stiffness $k_n$ using techniques that are well known in the art including, but not limited to, using experiments or estimated as a function of the material properties (Young's modulus and Poisson ratio). The process determines (1006) the overlap of the two contacting particles in vector form as described above. Using the normal elastic stiffness $k_n$ and the overlap between particles, the normal force on particle $\Omega^p$ at the contact point can be calculated (1008) using a linear elastic stiffness model such that $$F_n^p = -k_n \Delta n \tag{17}$$

where again, the $k_n$ is the normal elastic stiffness and $\Delta n$ is the overlap, in vector form, determined from the surface-surface intersection analysis discussed above. The sign convention used is that the normal vector n points away from the particle, which means that $\Delta n$ has a direction pointing away from particle $\Omega^p$ and hence the negative sign in equation (17). By action and reaction, the effective normal force on particle $\Omega^q$ contacting with particle $\Omega^p$ is then $$F_n^q = -F_n^p \tag{18}$$

The moment arm $R^p$ is denoted as the distance from the centroid of particle $\Omega^p$ to the contact point where the contact point is determined by the surface-surface intersection analysis as described above. The associated moment $M_n^p$ due to normal force $F_n^p$ can be calculated (1010) as $$M_n^p = R^p \times F_n^p \tag{19}$$

Similarly, the associated moment due to normal force on the contacting particle $\Omega^q$ can be calculated (1010) as $$M_n^q = R^q \times F_n^q \tag{20}$$

where $R^q$ is the moment arm extending from the centroid of particle $\Omega^q$ to the contact point for $\Omega^q$ where the contact point is again determined by the surface-surface intersection analysis as described above.

Determining Tangential Force and Associated Moments in 3D

Figure 11:
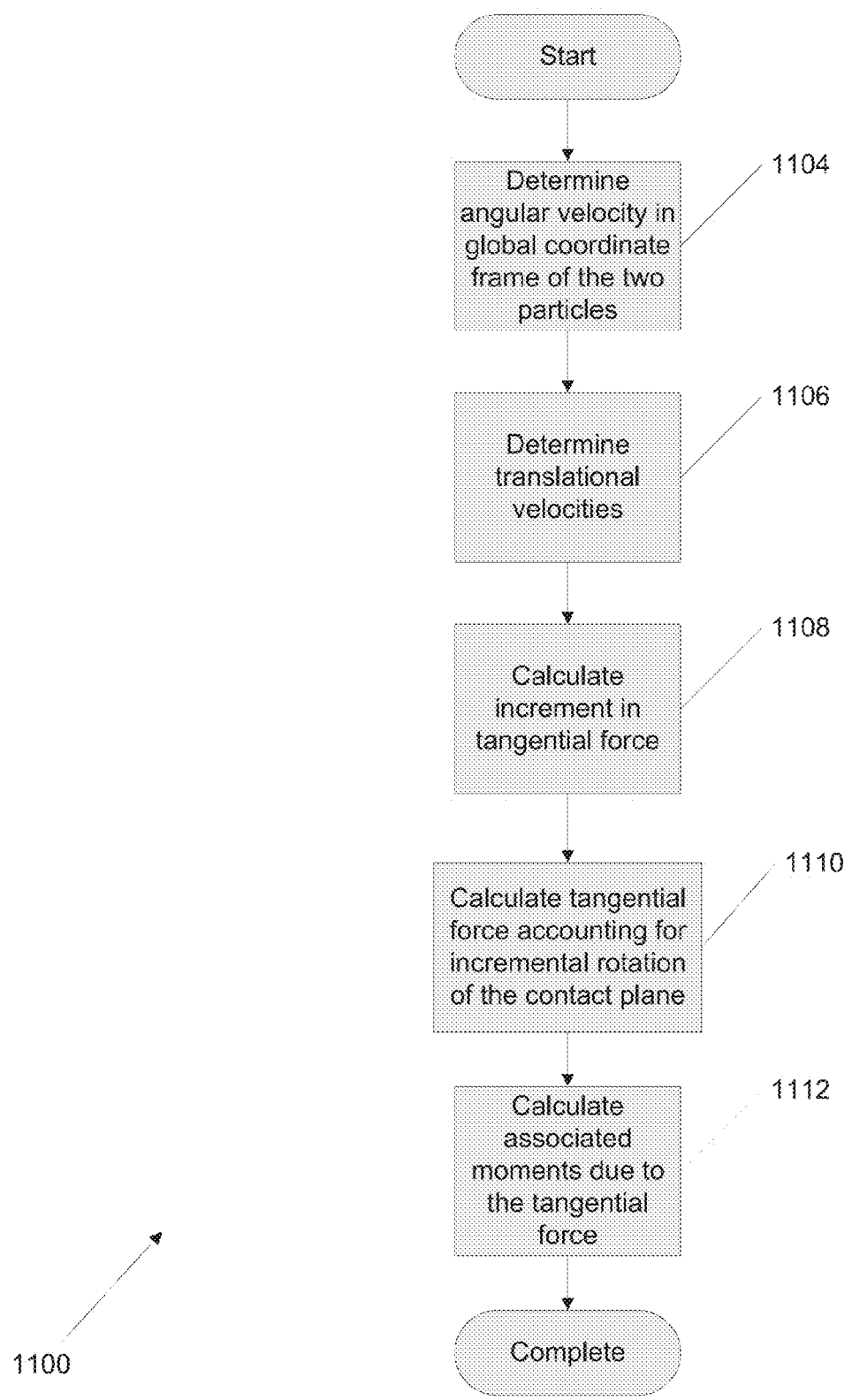
FIG. 11 is a flow chart illustrating a process for calculating tangential force and associated moments in 3D systems in accordance with an embodiment of the invention.

The incremental tangential forces can be calculated using a friction model where the tangential stiffness is initialized at time of first contact and exists until the particles separate. A process for determining the tangential forces and associated moments experience by two contacting particles described using NURBS representations in 3D in accordance with an embodiment of the invention is shown in FIG. 11. The process 1100 includes determining (1104) angular velocities $\omega^p$ and $\omega^q$ and translational velocities $v^p$ and $v^q$ in global coordinate frame of particles $\Omega^p$ and $\Omega^q$, respectively. Using the angular and translational velocities, the velocity of particle $\Omega^p$ relative to particle $\Omega^q$ at the contact point can be calculated (1106) as $$v = v^p + \omega^p \times R^p - v^q - \omega^q \times R^q \quad (21)$$

where $R^p$ and $R^q$ are the moment arms of particle $\Omega^p$ and $\Omega^p$, respectively as defined above.

The process also includes calculating (1108) the increment in tangential force $\Delta F_s^p$ on particle $\Omega^p$ such that $$\Delta F_s^p = -k_s \Delta s \quad (22)$$

where $$\Delta s = \Delta u - (\Delta u \cdot n) n \quad (23)$$

is the tangential incremental displacement obtained by projecting the incremental displacement in the tangential direction and where $$\Delta u = v \Delta t \quad (24)$$

is the incremental displacement. By action and reaction, the increment in tangential force on particle $\Omega^q$ can be defined as $$\Delta F_s^q = -\Delta F_s^p \quad (25)$$

Before the tangential force can be updated, it needs to be corrected to account for the incremental rotation of the contact plane. By way of definition, the previous tangential force vector at the contact point on particle $\Omega^p$ can first be corrected as $$F_s^p := Z F_s^p \quad (26)$$

where Z is the rotation matrix that rotates the previous normal vector $n^{prev}$ to the current normal vector n. Thus, the tangential force on particle $\Omega^p$, updated and accounting for incremental rotation of the contact plane, can be calculated (1110) as $$F_s^p := F_s^p + \Delta F_s^p \quad (27)$$

and where the value of $F_s^p$ is capped such that $$F_s^p := F_s^p \left( \frac{F_{max}}{\|F_s^p\|} \right) \quad (28)$$

where $$F_{max} = \|F_n^p\| \tan \phi \quad (29)$$

with $\phi$ being the interparticle friction angle. Again, by action and reaction, the tangential force on particle $\Omega^q$ contacting with particle $\Omega^p$ is $$F_s^q = -F_s^p \quad (30)$$

The process 1100 also includes calculating (1112) the corresponding moments associated with the tangential forces for particles $\Omega^p$ and $\Omega^q$, respectively such that $$M_s^p = R^p \times F_s^p \quad (31)$$

$$M_s^q = R^q \times F_s^q \quad (32)$$

where $R^p$ is the moment arm of $\Omega^p$ and $R^q$ is the moment arm of particle $\Omega^q$ as defined above. Although specific processes for determining forces and associated moments are discussed above with respect to FIGS. 10 and 11, any of a variety of processes for determining forces and associated moments of contacting particles described using NURBS representations in 3D can be utilized as appropriate to the requirements of a specific application in accordance with embodiments of the invention. Further, the techniques for determining contact forces and moments presented above correspond to classic and simple linear models. This is done for simplicity of presentation. However, the NURBS formulation presented can be extended to nonlinear contact models that exploit local information such as curvature, normal and tangential vectors, and non-convexity.

GEM Based Approach using Classical DEM Discrete Equations of Motion

A GEM based approach in many embodiments of the invention can utilize identical discrete equations of motion as those used in classical DEM approaches. These equations can be used to update the NURBS surfaces as discussed below. Forces and moments, which are induced by contact interactions between particles, are calculated as discussed above. The translational components are considered first; where the equation governing translational motion of the particle's center of mass can be defined by Newton's law as $$m a_i + C v_i = F_i \quad (33)$$

where i=1, 2, 3 in three dimensions, m is the mass of the particle, $C = \xi m$ is the damping which proportionally scales the linear velocity $v_i$, with $\xi$ being the global damping parameter. The linear acceleration is given by $a_i$ and is related to the resultant force $F_i$. To integrate the translational components of motion, the centered finite-difference integration scheme can be used such that $$v_i^{n+1/2} = \frac{1}{1 + \xi \Delta t / 2} \left[ (1 - \xi \Delta t / 2) v_i^{n-1/2} + \frac{\Delta t}{m} F_i \right] \quad (34)$$

$$x_i^{n+1} = x_i^n + \Delta t v_i^{n+1/2} \quad (35)$$

The control points of the NURBS patches of the particle can be translated by displacements according to $\Delta t v_i^{n+1/2}$.

For the rotational components of motion, quantities are defined with respect to the principal body-fixed frame. Consider the angular accelerations $\alpha_i$ given through the Euler's equations of motion as $$\alpha_1 = [M_1 + \omega_2 \omega_3 (I_2 - I_3) - \xi I_1 \omega_1] / I_1 \quad (36)$$

$$\alpha_2 = [M_2 + \omega_3 \omega_1 (I_3 - I_1) - \xi I_2 \omega_2] / I_2 \quad (37)$$

$$\alpha_3 = [M_3 + \omega_1 \omega_2 (I_1 - I_2) - \xi I_3 \omega_3] / I_3 \quad (38)$$

where $\omega_i$ for i=1, 2, 3 are the angular velocities, $M_i$ are the moments, and $I_i$ are the principal moments of inertia. Here, inertia-proportional damping is included via the global damping parameter $\xi$. The Euler equations are nonlinear due to the presence of the products of angular velocities on the right hand side. Therefore, to appropriately integrate the rotational components of motion, a predictor-corrector process is utilized, which can be described as follows:

1. Estimate the angular velocities at the current time step by assuming constant angular acceleration for an additional half step $$\omega_i'^n = \omega_i^{n-\frac{1}{2}} + \frac{1}{2}\Delta\omega_i^{n-1} \tag{39}$$

where $\Delta\omega_i^{n-1} = \alpha_i^{n-1}\Delta t$.

2. Calculate angular velocity predictors using the above estimates $$\Delta\omega'_1{}^n = \Delta t[M_1{}^n + \omega'_2{}^n\omega'_3{}^n(I_2-I_3) - \xi I_1\omega'_1{}^n]/I_1 \tag{40}$$

$$\Delta\omega'_2{}^n = \Delta t[M_2{}^n + \omega'_3{}^n\omega'_1{}^n(I_3-I_1) - \xi I_2\omega'_2{}^n]/I_2 \tag{41}$$

$$\Delta\omega'_3{}^n = \Delta t[M_3{}^n + \omega'_1{}^n\omega'_2{}^n(I_1-I_2) - \xi I_3\omega'_3{}^n]/I_3 \tag{42}$$

3. Predict angular velocities at the current time step $$\omega_i^n = \omega_i^{n-\frac{1}{2}} + \frac{1}{2}\Delta\omega_i'^n \tag{43}$$

4. Calculate angular velocity correctors $$\Delta\omega_1{}^n = \Delta t[M_1{}^n + \omega_2{}^n\omega_3{}^n(I_2-I_3) - \xi I_1\omega_1{}^n]/I_1 \tag{44}$$

$$\Delta\omega_2{}^n = \Delta t[M_2{}^n + \omega_3{}^n\omega_1{}^n(I_3-I_1) - \xi I_2\omega_2{}^n]/I_2 \tag{45}$$

$$\Delta\omega_3{}^n = \Delta t[M_3{}^n + \omega_1{}^n\omega_2{}^n(I_1-I_2) - \xi I_3\omega_3{}^n]/I_3 \tag{46}$$

Additional iterations can be performed by repeating 1 through 4 until the correctors converge to some desired tolerance.

5. Update angular velocities using the correctors $$\omega_i^{n+\frac{1}{2}} = \omega_i^{n-\frac{1}{2}} + \Delta\omega_i^n \tag{47}$$

For small time steps used to resolve the interparticle contacts and for quasi-static conditions in which the angular velocities are small, the number of iterations is typically small. Usually, between 3 and 5 iterations are involved to achieve machine precision tolerance. After obtaining the angular velocities, the orientation of the principal body-fixed frame can be updated using the singularity-free quaternion approach, which is described below. The rotation matrix that transforms vectors in global space to vectors in body frame is given by $$A = \begin{pmatrix} -q_1^2 + q_2^2 - q_3^2 + q_4^2 & -2(q_1q_2 - q_3q_4) & 2(q_2q_3 + q_1q_4) \\ -2(q_1q_2 + q_3q_4) & q_1^2 - q_2^2 - q_3^2 + q_4^2 & -2(q_1q_3 - q_2q_4) \\ 2(q_2q_3 - q_1q_4) & -2(q_1q_3 + q_2q_4) & -q_1^2 - q_2^2 + q_3^2 + q_4^2 \end{pmatrix} \tag{48}$$

where the $q_i$'s are the quaternions defined by $$q_1 = \sin\left(\frac{\theta}{2}\right)\sin\left(\frac{\Psi - \phi}{2}\right) \tag{49}$$

$$q_2 = \sin\left(\frac{\theta}{2}\right)\cos\left(\frac{\Psi - \phi}{2}\right) \tag{50}$$

$$q_3 = \cos\left(\frac{\theta}{2}\right)\sin\left(\frac{\Psi + \phi}{2}\right) \tag{51}$$

$$q_4 = \cos\left(\frac{\theta}{2}\right)\cos\left(\frac{\Psi + \phi}{2}\right) \tag{52}$$

and $\phi$, $\theta$ and $\psi$ are the Euler angles in the zx'z' notational convention. The initial values of the quaternions can be calculated using the initial configurations of the grains before the start of the simulation. The time derivatives of the quaternions can be expressed in terms of products of the quaternions with the angular velocities as a singularity-free set of equations $$\begin{pmatrix} \dot{q}_1 \\ \dot{q}_2 \\ \dot{q}_3 \\ \dot{q}_4 \end{pmatrix} = \frac{1}{2}\begin{pmatrix} -q_3 & -q_4 & q_2 \\ q_4 & -q_3 & -q_1 \\ q_1 & q_2 & q_4 \\ -q_2 & q_1 & -q_3 \end{pmatrix}\begin{pmatrix} \omega_1 \\ \omega_2 \\ \omega_3 \end{pmatrix} \tag{53}$$

with closure of the above system given by the normalization relation $$\sum_{i=1}^{4} q_i = 1 \tag{54}$$

The above system of equations can be solved using an explicit finite difference scheme which results in the following update equation $$q^{n+1} = B^{-1}B^T q^n \tag{55}$$

where $$q^n = \begin{pmatrix} q_1^n \\ q_2^n \\ q_3^n \\ q_4^n \end{pmatrix}, B = \begin{pmatrix} 1 & -\beta_3 & \beta_1 & \beta_2 \\ \beta_3 & 1 & \beta_2 & -\beta_1 \\ -\beta_1 & -\beta_2 & 1 & -\beta_3 \\ -\beta_2 & \beta_1 & \beta_3 & 1 \end{pmatrix} \tag{56}$$

and $$\beta_i = \frac{\Delta t}{4}\omega_i^{n+\frac{1}{2}} \tag{57}$$

and where $\square^T$ is the transpose operator. The equation (55) can be solved in closed form and it has been shown that equation (53) maintains the orthogonality relation of equation (54). Normalization of the quaternions, however, can be performed after each integration step to prevent normalization failure resulting from round-off error. The matrix $A^{n+1}$ of equation (48) at $t_{+1}$, can be evaluated using the quaternions in $q^{n+1}$. The updated orientation (triads) of the principal body-fixed frame is then given by the rows $A^{n+1}$. The rotation matrix for rotating the control points of the NURBS patches about the particle's center of mass is obtained as $$\Pi^{n+1} = A^{n+1T}A^n \tag{58}$$

In the next calculation cycle, the moments on each particle due to interparticle contact, calculated in the global frame, can be transformed into the principal body-fixed frame using $A^{n+1}$.

Discrete equations of motion as discussed above can be used in DEM approaches to update positions, forces, and moments of elements within the system. NURBS curves and surfaces are invariant under affine transformations and allow operations such as translations and rotations to be applied to NURBS curves and surfaces by applying them to their respective control points. Thus, a GEM based approach to analyzing particulate systems in accordance with many embodiments of the invention can utilize the discrete equations of motion as used in standard DEM approaches as discussed above.

Particulate System Analysis Applications

Figure 12:
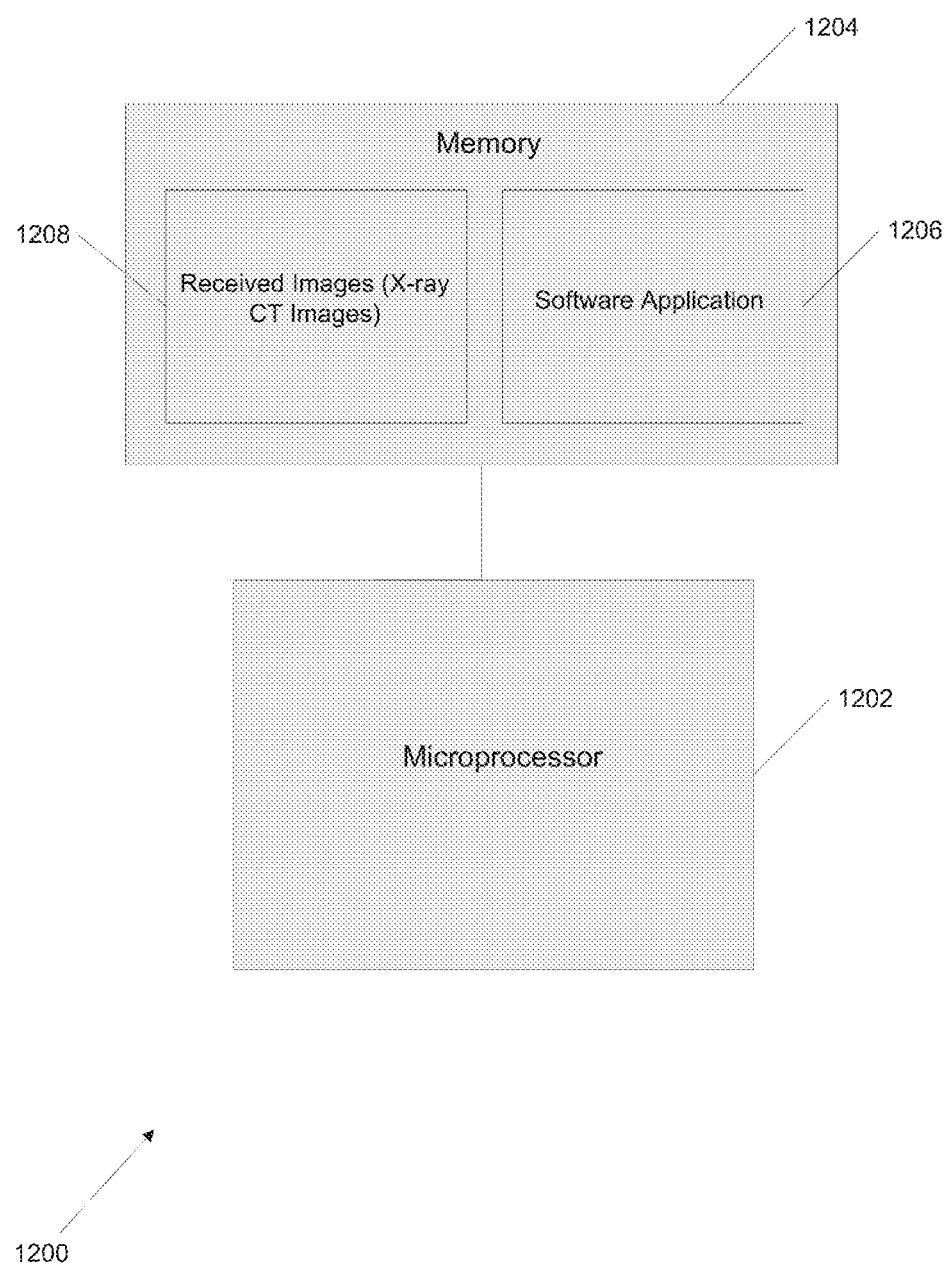
FIG. 12 is a block diagram of a computer configured using a particulate system analysis application in accordance with an embodiment of the invention.

In many embodiments, the methods outlined above are performed on a computer or computing device configured using a particulate system analysis application. A computer configured using a particulate system analysis application in accordance with an embodiment of the invention is conceptually illustrated in FIG. 12. The computer 1200 includes a processor 1202 and memory 1204. The memory contains a particulate system analysis application 1206. In many embodiments, the memory is also used to contain 3D images 1208 of particles in a particulate system such as (but not limited to) 3D X-ray CT images. The particulate system analysis application can configure the processor to generate NURBS descriptions of the particles in the 3D images and perform calculations enabling analysis of the behavior of the particulate system using the NURBS descriptions of the particles and the GEM techniques outlined above. Although specific particulate system analysis applications are discussed above with reference to FIG. 12, any of a variety of particulate system analysis applications can be utilized that enable any of a variety of processing or computing devices to execute methods similar to those outlined above to analyse the behavior of a particulate system in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of analyzing the behavior of a particulate system comprising a plurality of particles, where each particle possesses a particle morphology, the method comprising:

generating a Non-Uniform Rational Basis Spline (NURBS) description for the particle morphology for each of a plurality of particles within a particulate system in two dimensions using a processing system comprising a processor and memory, where the NURBS description of a given particle within the particulate system comprises a plurality of control points that define a control polygon bounding the geometry of a NURBS curve, a knot vector that determines the location of a plurality of knots, a basis function of a predetermined degree that determines the number of control points that influence any given point on the NURBS curve, and a plurality of weights that determine the effective contribution of a control point on the overall shape of the NURBS curve;

determining contact points between at least two particles within the particulate system using the processor of the processing system based on the NURBS description for the particle morphology of the at least two particles contained within the memory of the processing system;

determining a magnitude of the contact between the at least two particles within the particulate system using the processor of the processing system based on the NURBS description for the particle morphology of the at least two particles contained within the memory of the processing system by:

determining two intersection points of contact between two particles within the particulate system;

calculating a midpoint for the determined intersection points of contact;

determining normal and tangential unit vectors using the calculated midpoint;

determining intersection points between a line extending in both directions of the normal vector line and the boundaries of the two particles;

approximating an overlap distance between the two particles based on the intersection points between a line extending in both directions of the normal vector line and the boundaries of the two particles; and quantifying the magnitude of contact using the overlap distance between the two particles;

determining normal forces and associated moments using the processor of the processing system based upon data describing the contact points and the magnitude of the contact between the at least two particles contained within the memory of the processing system;

determining tangential forces and associated moments using the processor of the processing system based upon data describing the contact points and the magnitude of the contact between the at least two particles contained within the memory of the processing system; and performing mechanical analysis of the particulate system using the processor of the processing system based on data describing the contact between the at least two particles and the resulting forces and associated moments contained within the memory of the processing system.

2. The method of claim 1, wherein generating a NURBS description of the morphology of a given particle in 2D comprises generating a plurality of NURBS descriptions of the morphology of the given particle in 2D.

3. The method of claim 1, wherein determining normal forces and associated moments using the processor of the processing system based upon data describing the contact points and the magnitude of the contact between the at least two particles further comprises:

determining a normal elastic stiffness for a contact between two particles;

determining a contact damping parameter for the contact between the two particles;

calculating a normal component of relative velocity with respect to the two particles;

calculating a normal force using the normal elastic stiffness, contact damping parameter, and normal component of relative velocity for each of the two particles;

computing a moment arm for each of the two particles; and calculating an associated moment due to the calculated normal force for each of the two particles.

4. The method of claim 1, wherein determining tangential forces and associated moments using the processor of the processing system based upon data describing the contact points and the magnitude of the contact between the at least two particles further comprises:

determining angular velocities for each of the two particles;

calculating a relative tangential velocity for each of the two particles;

calculating an increment in tangential force using the relative tangential velocity for each of the two particles;

calculating a tangential force at a discrete time state using the calculated increment in tangential force for each of the two particles; and calculating an associated moment due to the tangential force for each of the two particles.

5. The method of claim 1, wherein performing mechanical analysis of the particulate system using the processor of the processing system based on the contact between the at least two particles and the resulting forces and associated moments using the processing system comprises performing mechanical analysis of the particulate system using the discrete element method (DEM).

6. A method of analyzing the behavior of a particulate system comprising a plurality of particles, where each particle possesses a particle morphology, the method comprising:

generating a Non-Uniform Rational Basis Spline (NURBS) description for the particle morphology for each of a plurality of particles in three dimensions (3D) within a particulate system using a processing system comprising a processor and memory, where the NURBS description of a given particle within the particulate system comprises a plurality of control points that define a control polygon bounding the geometry of a NURBS curve, a knot vector that determines the location of a plurality of knots, a basis function of a predetermined degree that determines the number of control points that influence any given point on the NURBS curve, and a plurality of weights that determine the effective contribution of a control point on the overall shape of the NURBS curve;

determining contact points between at least two particles within the particulate system using the processor of the processing system based on the NURBS description for the particle morphology of the at least two particles contained within the memory of the processing system;

determining the magnitude of the contact between the at least two particles within the particulate system using the processor of the processing system further comprises:

identifying pairs of intersecting portions of the surfaces of two particles based on the NURBS descriptions of the particle morphology of the two particles;

determining a closed intersection loop for the intersecting portions of the surfaces of two particles;

approximating a loop centroid and a loop normal for the closed intersection loop;

determining contact points between a line through the loop centroid extending in the direction of the loop normal and the surfaces of each of the two particles;

calculating an overlap distance between the two particles based on the contact points between the line through the loop centroid extending in the direction of the loop normal and the surfaces of each of the two particles; and quantifying the magnitude of contact based on the overlap distance between the two particles;

determining normal forces and associated moments using the processor of the processing system based upon the contact points and the magnitude of the contact between the at least two particles contained within the memory of the processing system;

determining tangential forces and associated moments using the processor of the processing system based upon data describing the contact points and the magnitude of the contact between the at least two particles contained within the memory of the processing system; and performing mechanical analysis of the particulate system using the processor of the processing system based on the data describing contact between the at least two particles and the resulting forces and associated moments contained within the memory of the processing system.

7. The method of claim 6, wherein:

the NURBS description of the particle morphology of each of the two particles comprises a plurality of NURBS patches, where each NURBS patch describes the particle morphology of a portion of the surface of one of the two particles; and identifying pairs of intersecting portions of the surfaces of two particles based on the NURBS descriptions of the particle morphology of the two particles comprises identifying intersections between the NURBS patches from the NURBS descriptions of the particle morphology of each of the two particles.

8. The method of claim 6, wherein determining a closed intersection loop for the intersecting portions of the surfaces of two particles comprises performing a surface-surface intersection analysis of at least the intersecting portions of the two surfaces of the two particles.

9. The method of claim 8, wherein determining a closed intersection loop by performing a surface-surface intersection analysis further comprises:

defining flat surfaces for the identified intersecting NURBS patches from the NURBS description of the particle morphology of each of the two particles;

discretizing the defined flat surfaces using triangular shapes;

applying a convex hull on a set of midpoints of intersection curves forming a closed polygon; and determining a closed intersection loop for the intersecting portions of the surfaces of two particles comprises approximating the intersection loop using the closed polygon.

10. The method of claim 6, wherein determining normal forces and associated moments using the processor of the processing system based upon the contact points and the magnitude of the contact between the at least two particles further comprises:

determining a normal elastic stiffness for a contact between two particles;

determining the overlap distance between the two particles;

calculating a normal force for each of the two particles using the normal elastic stiffness and the overlap distance between the two particles; and calculating an associated moment due to the calculated normal force for each of the two particles.

11. The method of claim 9, wherein the overlap distance is determined in vector form.

12. The method of claim 6, wherein determining tangential forces and associated moments using the processor of the processing system based upon the contact points and the magnitude of the contact between the at least two particles further comprises:

determining angular velocities for each of the two particles;

determining translational velocities for each of the two particles;

calculating an increment in tangential force for each of the two particles;

calculating a tangential force accounting for incremental rotation of the contact plane for each of the two particles; and calculating an associated moment due to the tangential force for each of the two particles.

13. The method of claim 6, wherein performing mechanical analysis of the particulate system using the processor of the processing system based on the contact between the at least two particles and the resulting forces and associated moments using the processing system comprises performing mechanical analysis of the particulate system using the discrete element method (DEM).

14. A method of analyzing the behavior of a particulate system comprising a plurality of particles, where each particle possesses a particle morphology, the method comprising:
  generating a Non-Uniform Rational Basis Spline (NURBS) description for the particle morphology of each of a plurality of particles within a particulate system in two dimensions using a processing system comprising a processor and memory, where the NURBS description of a given particle within the particulate system comprises a plurality of control points that define a control polygon bounding the geometry of a NURBS curve, a knot vector that determines the location of a plurality of knots, a basis function of a predetermined degree that determines the number of control points that influence any given point on the NURBS curve, and a plurality of weights that determine the effective contribution of a control point on the overall shape of the NURBS curve;
  determining contact points between at least two particles within the particulate system using the processor of the processing system based on the NURBS description for the particle morphology of the at least two particles contained within the memory of the processing system;
  determining a magnitude of the contact between the at least two particles within the particulate system using the processor of the processing system based on the NURBS description for the particle morphology of the at least two particles contained within the memory of the processing system by:
    determining two intersection points of contact between two particles within the particulate system;
    calculating a midpoint for the determined intersection points of contact;
    determining normal and tangential unit vectors using the calculated midpoint;
    determining intersection points between a line extending in both directions of the normal vector line and the boundaries of the two particles;
    approximating an overlap distance between the two particles based on the intersection points between a line extending in both directions of the normal vector line and the boundaries of the two particles; and
    quantifying the magnitude of contact using the overlap distance between the two particles;
  determining normal forces and associated moments using the processor of the processing system based upon data describing the contact points and the magnitude of the contact between the at least two particles contained within the memory of the processing system by:
    determining a normal elastic stiffness for a contact between two particles;
    determining a contact damping parameter for the contact between the two particles;
    calculating a normal component of relative velocity with respect to the two particles;
    calculating a normal force using the normal elastic stiffness, contact damping parameter, and normal component of relative velocity for each of the two particles; and
    computing a moment arm for each of the two particles; and
    calculating an associated moment due to the calculated normal force for each of the two particles;
  determining tangential forces and associated moments using the processor of the processing system based upon data describing the contact points and the magnitude of the contact between the at least two particles contained within the memory of the processing system by:
    determining angular velocities for each of the two particles;
    calculating a relative tangential velocity for each of the two particles;
    calculating an increment in tangential force using the relative tangential velocity for each of the two particles;
    calculating a tangential force at a discrete time state using the calculated increment in tangential force for each of the two particles; and
    calculating an associated moment due to the tangential force for each of the two particles; and
  performing mechanical analysis of the particulate system using the processor of the processing system based on data describing the contact between the at least two particles and the resulting forces and associated moments contained within the memory of the processing system.

15. A method of analyzing the behavior of a particulate system comprising a plurality of particles, where each particle possesses a particle morphology, the method comprising:
  generating a Non-Uniform Rational Basis Spline (NURBS) description for the particle morphology of each of a plurality of particles within a particulate system in three dimensions using a processing system comprising a processor and memory, where the NURBS description of a given particle within the particulate system comprises a plurality of control points that define a control polygon bounding the geometry of a NURBS curve, a knot vector that determines the location of a plurality of knots, a basis function of a predetermined degree that determines the number of control points that influence any given point on the NURBS curve, and a plurality of weights that determine the effective contribution of a control point on the overall shape of the NURBS curve;
  determining contact points between at least two particles within the particulate system using the processor of the processing system based on the NURBS description for the particle morphology of the at least two particles contained within the memory of the processing system;
  determining a magnitude of the contact between the at least two particles within the particulate system using the processor of the processing system based on the NURBS description for the particle morphology of the at least two particles using the processing system by
    identifying pairs of intersecting portions of the surfaces of two particles based on the NURBS descriptions of the particle morphology of the two particles;
    determining a closed intersection loop for the intersecting portions of the surfaces of two particles;
    approximating a loop centroid and a loop normal for the closed intersection loop;

determining contact points between a line through the loop centroid extending in the direction of the loop normal and the surfaces of each of the two particles;

calculating an overlap distance between the two particles based on the contact points between the line through the loop centroid extending in the direction of the loop normal and the surfaces of each of the two particles; and quantifying the magnitude of contact based on the overlap distance between the two particles;

determining normal forces and associated moments using the processor of the processing system based upon the contact points and the magnitude of the contact between the at least two particles contained within the memory of the processing system by:

determining a normal elastic stiffness for a contact between two particles;

determining the overlap distance between the two particles;

calculating a normal force for each of the two particles using the normal elastic stiffness and the overlap distance between the two particles; and calculating an associated moment due to the calculated normal force for each of the two particles;

determining tangential forces and associated moments using the processor of the processing system based upon the contact points and the magnitude of the contact between the at least two particles contained within the memory of the processing system:

determining angular velocities for each of the two particles;

determining translational velocities for each of the two particles;

calculating an increment in tangential force for each of the two particles;

calculating a tangential force accounting for incremental rotation of the contact plane for each of the two particles; and calculating an associated moment due to the tangential force for each of the two particles; and performing mechanical analysis of the particulate system using the processor of the processing system based on data describing the contact between the at least two particles and the resulting forces and associated moments contained within the memory of the processing system.

* * * * *